US009432161B2

(12) United States Patent
Esserman

(10) Patent No.: US 9,432,161 B2
(45) Date of Patent: Aug. 30, 2016

(54) SHARED CHANNEL RESOURCE ALLOCATION

(71) Applicant: ViaSat, Inc., Carlsbad, CA (US)

(72) Inventor: James Esserman, La Jolla, CA (US)

(73) Assignee: ViaSat, Inc., Carlsbad, CA (US)

(*) Notice: Subject to any disclaimer, the term of this patent is extended or adjusted under 35 U.S.C. 154(b) by 40 days.

(21) Appl. No.: 14/479,554

(22) Filed: Sep. 8, 2014

(65) Prior Publication Data
US 2016/0072613 A1    Mar. 10, 2016

(51) Int. Cl.
H04W 28/02     (2009.01)
H04L 5/00      (2006.01)
H04W 28/04     (2009.01)
H04W 72/04     (2009.01)

(52) U.S. Cl.
CPC .......... *H04L 5/0037* (2013.01); *H04L 5/0016* (2013.01); *H04L 5/0026* (2013.01); *H04W 28/0252* (2013.01); *H04W 28/0284* (2013.01); *H04W 28/04* (2013.01); *H04W 72/048* (2013.01)

(58) Field of Classification Search
None
See application file for complete search history.

(56) References Cited

U.S. PATENT DOCUMENTS

| 2004/0090916 | A1* | 5/2004 | Hosein | H04L 12/5695 370/235 |
| 2010/0215011 | A1* | 8/2010 | Pan | H04L 5/0064 370/329 |
| 2011/0242974 | A1* | 10/2011 | Das | H04L 47/781 370/230 |
| 2012/0195324 | A1* | 8/2012 | Raghuraman | H04L 47/00 370/431 |
| 2015/0201352 | A1* | 7/2015 | Shan | H04W 52/243 370/235 |

OTHER PUBLICATIONS iDirect; "A Powerful Combination, Integrating Group QoS & DVB-S2/ACM", Sep. 2009, 9 pages.

* cited by examiner

*Primary Examiner* — Mohammad Adhami
(74) *Attorney, Agent, or Firm* — Holland & Hart LLP

(57) ABSTRACT

Fair sharing of physical resources (e.g., symbols, etc.) of a communication channel shared by multiple terminals associated with terminal-specific code-points. Fair sharing of symbols may include allocating amounts of at least a subset of symbols of the communication channel to at least a subset of terminals in amounts determined based on the amount of the subset of symbols in relation to the number of terminals of the subset of terminals. The respective re-allocated shares may be independent of respective spectral efficiency values associated with the respective code-points for the subset of the terminals. The subset of terminals may be identified according to code-point and/or a determined operating condition such as a location of the terminal within a service area, antenna pointing error, rain fade, and the like. Bit rate service thresholds may be applied to fair sharing of symbols.

21 Claims, 17 Drawing Sheets

| Terminal | A | B | C | D | E |
|---|---|---|---|---|---|
| 505 { Code-Point (b/S) | 0.5 | 1.0 | 2.5 | 2.5 | 5.0 |
| 510 { Data Request (b) | 500 | 300 | 500 | 1000 | 500 |

|        | Terminal       | A   | B   | C   | D    | E   |
|--------|----------------|-----|-----|-----|------|-----|
| 1115   | Service Level  | 1.0 | 2.0 | 1.0 | 2.0  | 2.0 |
| 505-a  | Code-Point (b/S)| 0.5 | 1.0 | 2.5 | 2.5  | 5.0 |
| 510-a  | Data Request (b)| 500 | 300 | 500 | 1000 | 500 |

SHARED CHANNEL RESOURCE ALLOCATION

BACKGROUND

1. Field of the Disclosure

The present disclosure relates to wireless communications in general, and in particular, to sharing of resources in wireless communication systems.

2. Relevant Background

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include wireless wide area networks (more commonly called cellular communication systems), wireless local area networks (WLAN) such as Wi-Fi, satellite systems, and the like. Multiple access systems employ a multiple access radio technology including, for example, code division multiple access (CDMA), time division multiple access (TDMA), frequency division multiple access (FDMA), or orthogonal frequency division multiple access (OFDMA), and combinations thereof.

Communication channels of multiple-access systems may become congested when the amount of resources requested by users in a particular area meets or exceeds the available system resources. Such congestion causes challenges in allocating the system resources in multiple access wireless communication systems.

SUMMARY

A method for allocating resources via a shared communication channel is described. The method may be employed in a in a wireless communications system having a plurality of terminals serviced via the shared communication channel, where each code-point for coding and modulation of communications over the shared communication channel may be associated with a spectral efficiency value, and the resources may be defined by physical resource units including frequency and time resources of the shared communication channel. The method may include identifying respective code-points for the plurality of terminals serviced via the shared communication channel for a first time period, receiving resource requests associated with requested data transmissions for the plurality of terminals for the first time period, identifying a congestion condition when aggregate demand for physical resource unit allocations for the plurality of terminals exceeds available physical resource units of the shared communication channel for the first time period based on a provisional allocation according to the respective resource requests and the respective code-points associated with the plurality of terminals, and re-allocating a subset of the available physical resource units of the shared communication channel to a subset of terminals of the plurality of terminals in response to the congestion condition, the subset of terminals comprising at least two terminals having different code-points, wherein respective re-allocated shares of the subset of the available physical resource units for the subset of terminals are determined based on an amount of resources of the subset of the available physical resource units in relation to a number of terminals of the subset of terminals, and wherein the respective re-allocated shares are independent of the respective spectral efficiency values associated with the respective code-points for the subset of the terminals.

An apparatus for allocating resources via a shared communication channel is described. The apparatus may be employed in a wireless communications system having a plurality of terminals serviced via the shared communication channel, where each code-point for coding and modulation of communications over the shared communication channel may be associated with a spectral efficiency value, and where the resources may be defined by physical resource units including frequency and time resources of the shared communication channel. The apparatus may include a terminal code-point module configured to identify respective code-points for the plurality of terminals serviced via the shared communication channel for a first time period, a resource request module configured to receive resource requests associated with requested data transmissions for the plurality of terminals for the first time period, a provisional allocation module configured to identify a congestion condition when aggregate demand for physical resource unit allocations for the plurality of terminals exceeds available physical resource units of the shared communication channel for the first time period based on a provisional allocation according to the respective resource requests and the respective code-points associated with the plurality of terminals, and a symbol fair sharing module configured to re-allocate a subset of the available physical resource units of the shared communication channel to a subset of terminals of the plurality of terminals in response to the congestion condition, the subset of terminals comprising at least two terminals having different code-points, wherein respective re-allocated shares of the subset of the available physical resource units for the subset of terminals are determined based on an amount of resources of the subset of the available physical resource units in relation to a number of terminals of the subset of terminals, and wherein the respective re-allocated shares are independent of the respective spectral efficiency values associated with the respective code-points for the subset of the terminals.

A non-transitory computer-readable medium for allocating resources of a shared communication channel is described. The non-transitory computer-readable medium may be employed in a wireless communications system having a plurality of terminals serviced via the shared communication channel, where each code-point for coding and modulation of communications over the shared communication channel may be associated with a spectral efficiency value, and where the resources are defined by physical resource units including frequency and time resources of the shared communication channel. The non-transitory computer-readable medium may store instructions executable by a processor for identifying respective code-points for the plurality of terminals serviced via the shared communication channel for a first time period, receiving resource requests associated with requested data transmissions for the plurality of terminals for the first time period, identifying a congestion condition when aggregate demand for physical resource unit allocations for the plurality of terminals exceeds available physical resource units of the shared communication channel for the first time period based on a provisional allocation according to the respective resource requests and respective code-points associated with the plurality of terminals, and re-allocating a subset of the available physical resource units of the shared communication channel to a subset of terminals of the plurality of terminals in response to the congestion condition, the subset of terminals comprising at least two terminals having different code-points, wherein respective re-allocated shares of the subset of the available physical resource units for the subset of terminals are determined based on an amount of resources of the subset of the available physical resource units in relation to a number of terminals of the subset of terminals, and wherein the respective re-allocated shares are independent of the respective spectral efficiency values associated with the respective code-points for the subset of the terminals.

Some examples of the described methods may include communicating resource grants for the plurality of terminals for the first time period, wherein respective data transmitted to the plurality of terminals according to the resource grants is coded and modulated onto the shared communications channel according to the respective code-points identified for the plurality of terminals. The described apparatuses and/or non-transitory computer-readable medium may be configured for or may include instructions executable by a processor for performing these features.

In some examples of the method, apparatuses, and/or non-transitory computer-readable medium described above, each of the plurality of terminals may be associated with a provisioned service level. In some examples of the described methods, the re-allocating may include re-allocating the subset of the available physical resource units for the first time period to the subset of terminals such that the respective re-allocated shares are proportionate to the respective provisioned service levels associated with the subset of terminals. The provisioned service levels may include any of a minimum information rate, a committed information rate, a peak information rate, or combinations thereof. The described apparatuses and/or non-transitory computer-readable medium may be configured for or may include instructions executable by a processor for performing these features.

In some examples of the method, apparatuses, and/or non-transitory computer-readable medium described above, the subset of terminals may include terminals of the plurality of terminals for which respective spectral efficiency values are below a threshold for the first time period. In some examples of the method, apparatuses, and/or non-transitory computer-readable medium described above, the respective re-allocated shares for the first time period for the at least two terminals having different code-points may include a same amount of physical resource units when the at least two terminals have a same provisioned service level.

In some examples, the described methods may include determining respective proportional resource allocations for the plurality of terminals for the first time period based on respective service levels for the plurality of terminals and the available physical resource units for the shared communication channel for the first time period, and determining respective requested physical resource units for the plurality of terminals for the first time period based on the resource requests and the respective spectral efficiency values for the plurality of terminals. The subset of terminals may include terminals for which the respective requested physical resource units exceed the respective proportional resource allocation for the first time period. The described apparatuses and/or non-transitory computer-readable medium may be configured for or may include instructions executable by a processor for performing these features.

In some examples, the described methods may include determining the subset of the available physical resource units as physical resource units for the first time period of the available physical resource units remaining after allocation of physical resource units of the available physical resource units to terminals for which the respective requested physical resource units do not exceed the respective proportional resource allocations for the first time period. The described apparatuses and/or non-transitory computer-readable medium may be configured for or may include instructions executable by a processor for performing these features.

In some examples, the described methods may include determining for one or more terminals of the subset of terminals that an allocated service rate, according to the respective re-allocated shares for the one or more terminals and the respective spectral efficiency values for the one or more terminals, is below a service rate threshold, and re-allocating the available physical resource units such that the one or more terminals are allocated amounts of physical resource units corresponding to the service rate threshold based on the respective spectral efficiency values of the one or more terminals. The described apparatuses and/or non-transitory computer-readable medium may be configured for or may include instructions executable by a processor for performing these features.

In some examples, the described methods may include identifying the subset of terminals for the re-allocating based on any of: locations of the subset of terminals within a coverage area of at least one service beam, pointing errors associated with the subset of terminals, a rain fade condition for the subset of terminals, and combinations thereof. The described apparatuses and/or non-transitory computer-readable medium may be configured for or may include instructions executable by a processor for performing these features.

In some examples of the method, apparatuses, and/or non-transitory computer-readable medium described above the coding and modulation of communications over the shared communication channel includes adaptive coding and modulation (ACM) according to respective channel conditions for the plurality of terminals.

In some examples of the method, apparatuses, and/or non-transitory computer-readable medium described above, the shared communication channel is one of a service beam communication channel or a feeder beam communication channel of a satellite communications system.

In some examples of the method, apparatuses, and/or non-transitory computer-readable medium described above, the shared communication channel is one of a forward link communication channel or a return link communication channel of the wireless communications system.

In some examples of the method, apparatuses, and/or non-transitory computer-readable medium described above, the physical resource units include symbols of one or more carriers of the shared communication channel.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to allocation of symbols of a shared communication channel to improve overall utilization of system resources. The communication channel may be shared by multiple terminals, where signals of the shared communication channel (e.g., downlink, uplink, forward link, return link, etc.) are communicated according to terminal-specific code-points. In aspects, fair sharing of symbols includes allocating proportionate (e.g., equal, service level weighted, etc.) amounts of available symbols to at least a subset of terminals serviced by the shared communication channel. Fair sharing of symbols to the subset of terminals may be performed independently of the assigned code-points to the terminals. For example, fair sharing of symbols may allocate the same number of symbols to terminals having different code-points. Thus, terminals having the same service level but different code-points may be allocated different effective bit rates (e.g., inversely proportional to the spectral efficiency associated with their respective code-points, etc.).

In some examples, fair sharing of symbols may be applied to a set of terminals identified according to code-point and/or a determined operating condition. For example, fair sharing of symbols may be applied to terminals having code-points with spectral efficiencies below a threshold efficiency value. Additionally or alternatively, fair sharing of symbols may be applied to terminals for which low spectral efficiency is determined to be caused by a location of the terminal within a coverage area of a service beam, antenna pointing error, rain fade, and/or other operating condition. Terminals having code-points above the threshold efficiency value may be allocated according to their resource requests and/or fair sharing of bits (e.g., weighted by service level, etc.). In some aspects, bit rate service thresholds may be applied to fair sharing of symbols.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
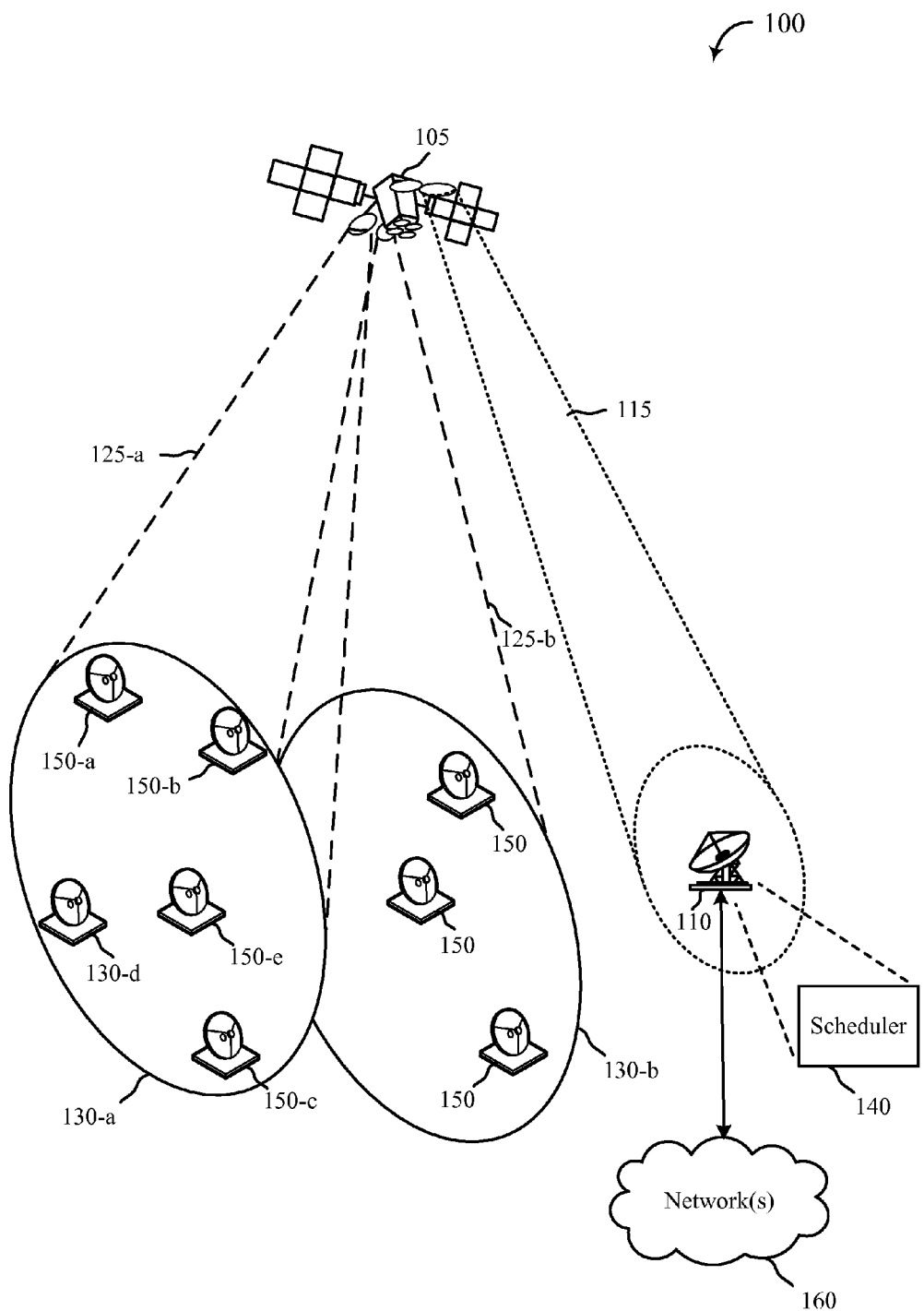
FIG. 1 shows a block diagram of an example satellite communication system including components configured according to various aspects of the present disclosure.

FIG. 1 shows a simplified diagram of an example satellite communications system 100 in which the principles included herein may be described. The satellite communications system 100 includes a gateway system 110 which is configured to communicate with one or more subscriber terminals 150 via a satellite 105. The satellite communications system 100 may be any suitable type of satellite system, including a geostationary satellite system or low earth orbit (LEO) satellite system. The gateway system 110 may be connected to a network 160, which may connect the gateway system 110 with other gateway systems, which may also be in communication with the satellite 105. The network 160 may include private networks (e.g., Intranets, backhaul networks, content delivery networks, etc.) and/or public networks (e.g., the Internet, etc.) and may be a data source and/or sink for data communications via the satellite communications system 100.

The satellite 105 may communicate with the gateway system 110 via one or more feeder beams 115, and may communicate with the terminals 150 via service beams 125. The satellite 105 may, for example, use a reflector antenna, lens antenna, array antenna, active antenna, or other mechanism known in the art for reception of such signals. On the forward link, the satellite 105 may process signals received from gateway system 110, and then route and transmit the processed signal down to terminals 150. On the reverse link, the satellite may process signals received from terminals 150, and then route and transmit the processed return link signals to the gateway system 110.

In one embodiment, the satellite 105 operates in a multi-beam mode, supporting a number (e.g., typically 20-100, etc.) of service beams 125 each directed at a different region of the earth. This can allow coverage of a relatively large geographical area and frequency re-use within the covered area. Frequency re-use in multi-beam satellite systems permits an increase in capacity of the system for a given system bandwidth. In many embodiments, the service beams 125 are fixed location beams, meaning that the angular beamwidth and coverage area for each beam does not intentionally vary with time.

Each service beam 125 of the satellite 105 supports the terminals 150 within its coverage area 130 (e.g., providing uplink and downlink resources). Frequency re-use between service beams may be provided by assigning one, or more, ranges of frequencies to each service beam and/or by use of orthogonal polarizations. A particular frequency range and/or polarization may be called a "color," and frequency re-use in a tiled spot beam satellite system may be according to color. The coverage of different beams may be non-overlapping or have varying measures of overlap. In one embodiment, service beams of the satellite 105 may be tiled and partially overlapping to provide complete or almost complete coverage for a relatively large geographical area (e.g., the Contiguous United States (CONUS), etc.) where partially overlapping or adjacent beams use different ranges of frequencies and/or polarizations. For the sake of simplicity, only two service beams 125 are shown in FIG. 1, providing forward link and return link communications for user terminals within respective beam coverage areas 130.

A terminal 150 may use an antenna to receive signals from the satellite and to transmit signals to the satellite 105. In one embodiment, the antenna is a parabolic reflector with high directivity in the direction of the satellite 105 and low directivity in other directions. The antenna may have a variety of alternative configurations and include operating features such as high isolation between orthogonal polarizations, high efficiency in the operational frequency bands, and low noise. Terminals 150 may have different antenna sizes and power ranges, which may be accommodated by configuring carriers on the uplink and downlink as appropriate for the capabilities of the antenna. Terminals 150 may be mobile or fixed, and thus may log on to different service beams 125 depending on location and may move from beam to beam.

Terminals 150 may include an indoor unit (IDU) and an appropriately sized antenna and RF equipment (the outdoor unit ODU). The IDU and ODU may be connected using an appropriate interface and the IDU may include a satellite modem and provide IP router (e.g., wired or wireless) functionality to customer premises equipment (e.g., laptop or desktop computer, tablet, smartphone, set-top box, smart television, etc.) serviced by the terminal 150.

The terminals 150 may be provisioned with communication services in the system 100 according to service level agreements between the service provider and the subscriber associated with the terminal. For example, communication service may be provided in various service level plans according to Quality of Service (QoS) to be provided at the terminal according to a set of traffic policies (e.g., rate-based, usage-based, time-based, etc.). For example, QoS for terminals may be specified by a minimum information rate (MinIR), committed information rate (CIR), peak information rate (PIR), a maximum amount of data (e.g., 2 GB/month), and the like.

The gateway system 110 may also use an antenna to receive signals from the satellite 105 and to transmit signals to the satellite 105. The gateway system may include one or more satellite modem units, which may perform coding and modulation of data received from the network for forward link transmissions and perform de-modulation and decoding of data received from satellite 105 on the return link. The satellite modem units may transmit and receive signals according to the signal modulation and multiplexing techniques used for the carrier frequencies of the system bandwidth of the satellite communication system 100.

With such a multi-beam satellite, there may be a number of different signal switching configurations, allowing signals from a single gateway system 110 to be switched between different service beams 125. Different multiplexing schemes may be used as well, including Multi-Frequency Time-Division Multiple Access (MF-TDMA), TDMA, Frequency Division Multiple Access (FDMA), Orthogonal Frequency Division Multiple Access (OFDMA), Code Division Multiple Access (CDMA), or any number of hybrid or other schemes known in the art.

A variety of physical layer transmission modulation and coding techniques may be used on links between the satellite 105 and the gateway system 110 and/or terminals 150, including those defined with the Digital Video Broadcasting (DVB) set of standards. In various embodiments, the physical layer techniques may be the same, or different, for forward and return links between the satellite 105 and gateway system 110 and/or terminals 150. In various examples, the system 100 supports modulation techniques including binary phase shift keying (BPSK), quadrature phase shift keying (QPSK), quadrature amplitude modulation (QAM), amplitude and phase-shift keying (APSK), and the like. The system may support one or more forward error correction (FEC) techniques such as Turbo coding, convolutional coding, Reed-Solomon coding, low-density parity-check (LDPC) coding, and the like.

Data sent over the downlink and uplink of the service beam 125 may be formatted using a modulation and coding scheme (MCS) that may be custom to the satellite or similar to others in the industry. For example, the MCS may include multiple code-points that each are associated with a modulation technique (e.g., BPSK, QPSK, 16QAM, 64QAM, 256QAM, etc.) and a coding rate that is based on the ratio of the coded information bits to the total coded bits including redundant information.

Signals transmitted over the gateway beams 115 and/or service beams 125 may employ Adaptive Coding and Modulation (ACM), Variable Coding and Modulation (VCM), and the like, where each user terminal may be assigned a code-point and code-points assigned to terminals can vary with time as channel conditions between the satellite 105 and the terminal 150 change. The assigned code-point affects the spectral efficiency of data transmissions between the gateway system 110 and satellite 105, and between the satellite 105 and the terminals 150.

Several factors can affect the code-point for particular user terminals 150. For example, the code-point may be dependent on the gain of the service beam at the location of the terminal (e.g., downlink received power is highest at the center of the beam), current weather conditions between the satellite 105 and the terminal 150 (e.g., rain fade, etc.), interference conditions, pointing errors at the terminal 150, and other factors.

For ACM on the forward link, each terminal may measure received power (e.g., Equivalent Isotropic Radiated Power (EIRP), etc.), and report the measured received power back to the satellite 105 or gateway system 110, which may adapt the code-point for forward link transmission from the gateway system 110 and/or satellite 105 to the terminal 150 to the current conditions. Similar ACM techniques may also be applied to return link transmissions from the terminals 150 to the satellite 105 and/or gateway system 110.

The service beams 125 and/or gateway beams 115 of the satellite communication system 100 may each include multiple communication channels, where the resources of each communication channel are shared between multiple terminals 150 for forward link and/or return link communications. Allocation of resources for the communication channels may be performed according to allocation time periods and may be performed according to resource requests for forward link and/or return link data. Allocation of resources of the communication channels may be performed by a scheduler, which may implemented in components of the network 160, gateway system 110, and/or satellite 105. The scheduler may provide resource assignments to the satellite modems in the gateway system 110 and/or terminals 150, which may then perform coding and modulation on data packets and transmit the modulated signals on the assigned.

For clarity of description, five terminals 150 are illustrated in beam coverage area 130-a. For example, the illustrated terminals may correspond to terminals requesting resources of a communication channel of service beam 125-a in a given time period used for resource allocation. The illustrated terminals include Terminal A 150-a, Terminal B 150-b, Terminal C 150-c, Terminal D 150-d, and Terminal E 150-e. However, it should be understood that service beam 125-a may support more or fewer terminals.

Service beam 125-a may be allocated a portion of system resources (e.g., a color, etc.), and the portion of system resources allocated to service beam 125-a may be static or may vary with time (e.g., semi-statically, dynamically, etc.).

For the purposes of description, allocation of physical resources for a communication channel of service beam 125-a is described in more detail. However, it should be understood that service beam 125-a may include multiple communication channels, and the number of communication channels of service beam 125-a may vary with time. Thus, the described techniques for fair sharing of symbols of a communication channel may be applied to one or more communication channels of service beam 125-a, and the allocated physical resource units may vary with time according to resource requirements of the satellite communications system 100 or other factors. Further, the described techniques can be applied to gateway beams 115 or any other communication channel where transmissions to multiple destinations may be carried using different code-points over a shared channel.

A scheduler 140 may receive resource requests associated with transmissions (e.g., downlink, uplink, forward link, return link, etc.) for Terminals A-E in a given time period. For clarity of description, allocation of resources may generally be described for forward link transmission to Terminals A-E in a given time period. However, it should be understood that the described principles and examples may be applied to return link transmissions from Terminals A-E. While illustrated as a component of the gateway system 110, the functionality of the scheduler 140 may be implemented by one or more processor-based systems of the satellite 105, the gateway system 110, and/or one or more satellite communication management systems (e.g., core node, network control center, etc.).

Where a communication channel is uncongested, physical resources may be allocated to each terminal such that all the data requested to be transmitted in the time period can be transmitted in the time period at the respective code-points for terminals. However, where the aggregate demand for physical resources of the communication channel is greater than the available physical resources, not all data that has been requested to be transmitted in the time period can be accommodated by the physical resources at the assigned code-points.

Conventionally, sharing of the communication channel at times of congestion may be performed according to the requested amounts of data or bit rate for each terminal and may be weighted according to service level. However, terminals communicating with code-points having low spectral efficiency will take up a disproportionate amount of physical resources to maintain the same bit rate as terminals having code-points with relatively higher spectral efficiency values for the time period. Thus, as congestion occurs, the overall effective bit-rate of the communication channel will decline, which may make the congestion conditions worse.

The described embodiments include techniques for fair sharing of symbols of a shared communication channel to improve overall utilization of system resources. In aspects, fair sharing of symbols includes allocating proportionate (e.g., weighted according to service level, etc.) amounts of available symbols to at least a subset of terminals serviced by the shared communication channel. Fair sharing of symbols to the subset of terminals may be performed independently of the assigned code-points to the terminals. For example, fair sharing of symbols may allocate the same number of symbols to terminals having different code-points. Thus, terminals having the same service level but different code-points may be allocated different effective bit rates that may be inversely proportional to the spectral efficiency associated with their respective code-points.

In some examples, fair sharing of symbols may be applied to a set of terminals identified according to code-point and/or a determined operating condition. For example, fair sharing of symbols may be applied to a set terminals having code-points with spectral efficiencies below a threshold efficiency value. Fair sharing of symbols may be applied to a subset of the set of terminals for which the low spectral efficiency is determined to be caused by a location of the terminal within a coverage area of a service beam, antenna pointing error, rain fade, and/or other operating conditions. Terminals having code-points above the threshold efficiency value may be allocated according to their resource requests and/or fair sharing of bits (e.g., weighted by service level, etc.). In some aspects, bit rate service thresholds may be applied to fair sharing of symbols. For example, fair sharing of symbols may be applied for terminals having low spectral efficiency code-points but the effective bit rate may be maintained above a low bit rate threshold.

Although the present description illustrates the described techniques in a satellite communication system such as the system 100 of FIG. 1, it should be appreciated that the principles and techniques herein can be applied to other communication systems. In particular, the described techniques can be applied to any communication system applying a multiple access technique where modulation techniques can vary for different terminals serviced via a shared channel.

Figure 2:
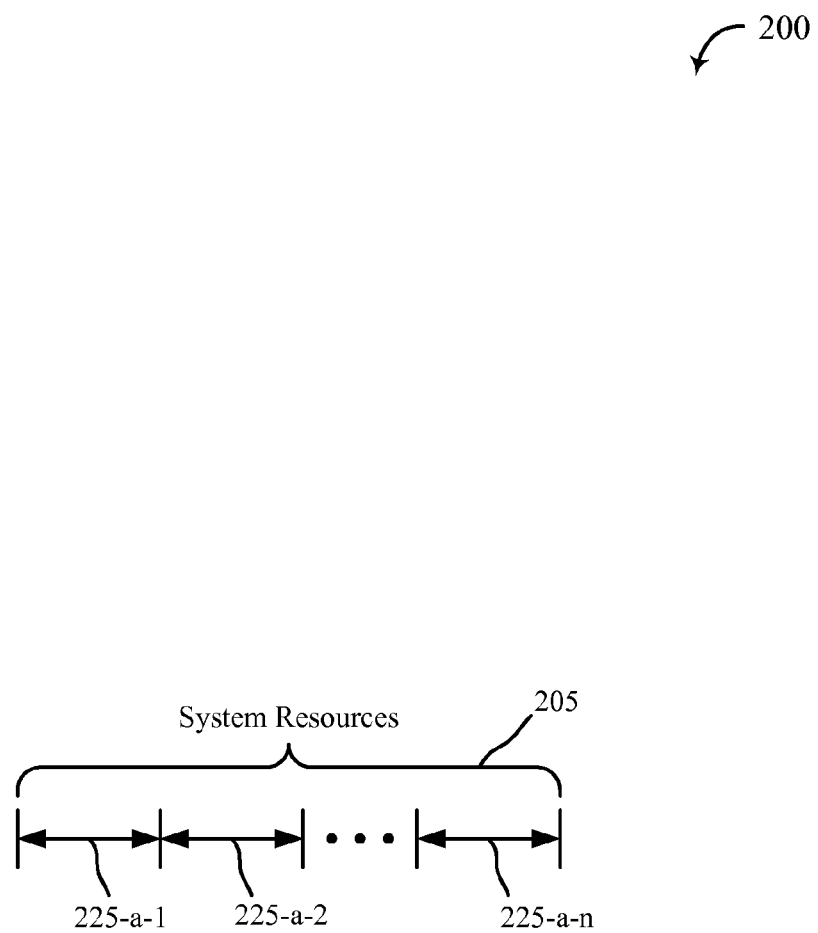
FIG. 2 shows a simplified diagram of an example configuration of system resources in accordance with various aspects of the disclosure.

FIG. 2 shows a simplified diagram 200 illustrating an example configuration of system resources 205 in accordance with various aspects of the disclosure. For example, system resources 205 may illustrate frequency spectrum for forward link, return link, downlink, and/or uplink communications, and may be configured as N carriers 225-a-1, 225-a-2, ... 225-a-n. Each carrier 225-a may include one or more sub-carriers and may include different or configurable symbol rates and carrier bandwidth.

In one embodiment, forward link frequency spectrum for a service beam may be configured in a multi-frequency time-division multiple access (MF-TDMA) format with N downlink carriers. Each downlink carrier may be divided (e.g., in frequency, etc.) into communication channels, where each communication channel may be divided into sub-channels, which may be an allocatable portion of frequency resources. Each downlink communication channel may be divided in time into fixed period frames, and each frame may contain a number of variable sized time slots, or bursts. In general, terminals 150 may be assigned a number of sub-channels for each time slot for transmission or reception of data. The data transmission for each time slot may use a specific code-point based on the current link conditions between the gateway system and/or satellite 105 and the terminal 150, and may contain one or more packet segments. Certain time slots or bursts may be used for network control packets for terminal acquisition, terminal synchronization maintenance, and control information including resource grants and/or requests. For example, channels or slots may be designated for transmitting and receiving resource requests and responsive resource grants between the scheduler 140 and terminals 150. Alternatively, resource requests and grants may be communicated via other means outside of the system 100.

The carriers 225 may be statically, semi-statically, or dynamically assigned to beams (e.g., service beams, gateway beams, etc.). For example, system resources 205 may represent a beam bandwidth that may be a portion of communication system resources (e.g., a color, etc.). Beam bandwidth 205 may include a number of carriers 225, which each may be a modulated signal waveform. The carriers 225 may be modulated as single-carrier waveforms (e.g., CDMA, etc.) or multi-carrier waveforms (e.g., OFDMA, etc.) and each carrier may include a number of symbols that can be carried over the carrier frequency range within a given period of time (e.g., epoch, frame, subframe, slot, symbol period, etc.). Each carrier 225 may include one or more communication channels, which may be allocated to one or more terminals in accordance with the principles described herein. Terminals may be, for example, statically, semi-statically, or dynamically assigned to a carrier 225 of the system resources 205.

Various types of time-frequency resources are described generally herein as "physical resource units." For example, a physical resource unit may include an assignable or allocatable portion of frequency resources (e.g., channel, sub-channel, subcarrier, or set of sub-carriers, etc.) for an allocatable time period (e.g., epoch, frame, sub-frame, slot, symbol period, etc.) and may include signaling overhead such as guard intervals, guardband, a cyclic prefix, and the like. Thus, each physical resource unit may represent a number of modulated symbols (e.g., one or more symbols), where each modulated symbol may carry a number of coded bits according to the modulation technique (e.g., code-point) used for the symbol.

Figure 3:
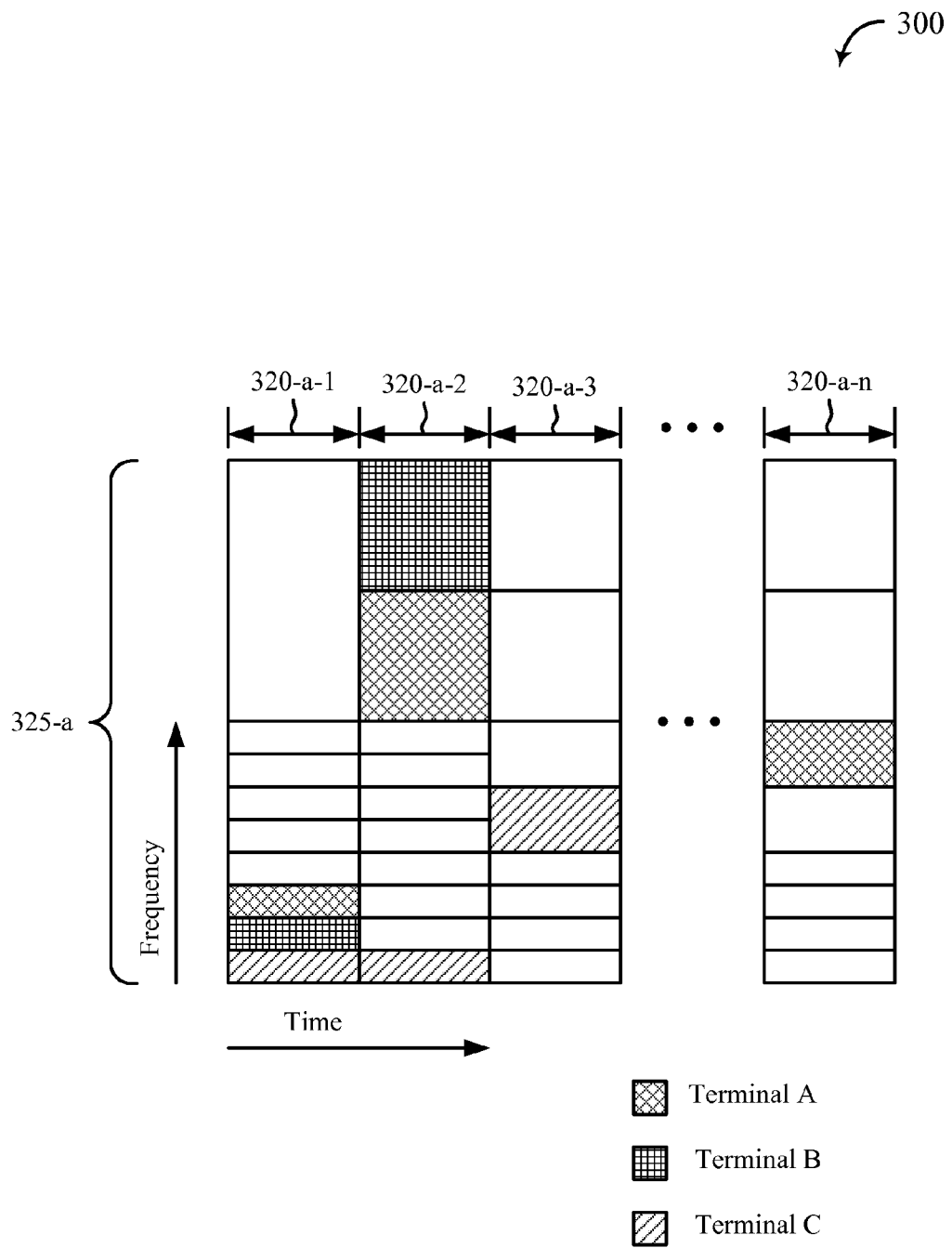
FIG. 3 shows a simplified diagram of an example allocation of system resources in accordance with aspects of the present disclosure.

FIG. 3 shows a simplified diagram 300 of an example allocation of system resources in accordance with aspects of the present disclosure. Diagram 300 illustrates an example allocation for a communication channel 325-a, which may be a carrier 225 or portion of a carrier 225 illustrated in FIG. 2.

Communication channel 325 may be shared (e.g., according to a multiple access technique, etc.) by multiple terminals and allocation of resources of communication channel 325 to terminals may be performed according to time periods 320-a. For each time period 320-a, resource requests may be received (e.g., at a scheduler) from a network and/or the terminals. In the system 100 of FIG. 1, for example, the scheduler may receive information including resource requests for time periods 320-a from gateway system 110 for scheduling forward link transmissions. The scheduler may receive resource requests from terminals 150 for return link transmissions, which may be communicated via a return link channel of the system 100 or via means outside the system 100. Resource requests may be in the form of a requested data rate, packet queue lengths, or data buffer sizes for communication sessions for terminals serviced by the communication channel 325. Thus, resource requests may be according to an amount of data (e.g., bits, bytes, kilobits (kb), kilobytes (kB), etc.) or data rate (e.g., kb/second, kB/second, etc.). Time periods 320-a may correspond to frames, subframes, time slots, bursts, epochs, or some other time period for performing resource allocation.

As illustrated in FIG. 3, resource allocations to terminals 150 may be different portions of communication channel 325 in different time periods 320-a based on different amounts of requested resources for the different time periods 320-a. For example, FIG. 3 illustrates that terminal A is allocated resources of varying amounts in time periods 320-a-1, 320-a-2, and 320-a-n, while not receiving a resource allocation in time period 320-a-3. Terminal B may receive resource allocations in time periods 320-a-1 and 320-a-2, while Terminal C may receive resource allocations in time periods 320-a-1, 320-a-2 and 320-a-3. Other resources of communication channel 325 may be allocated to other terminals in the illustrated time periods 320-a, and some resources may remain unallocated.

Figure 4:
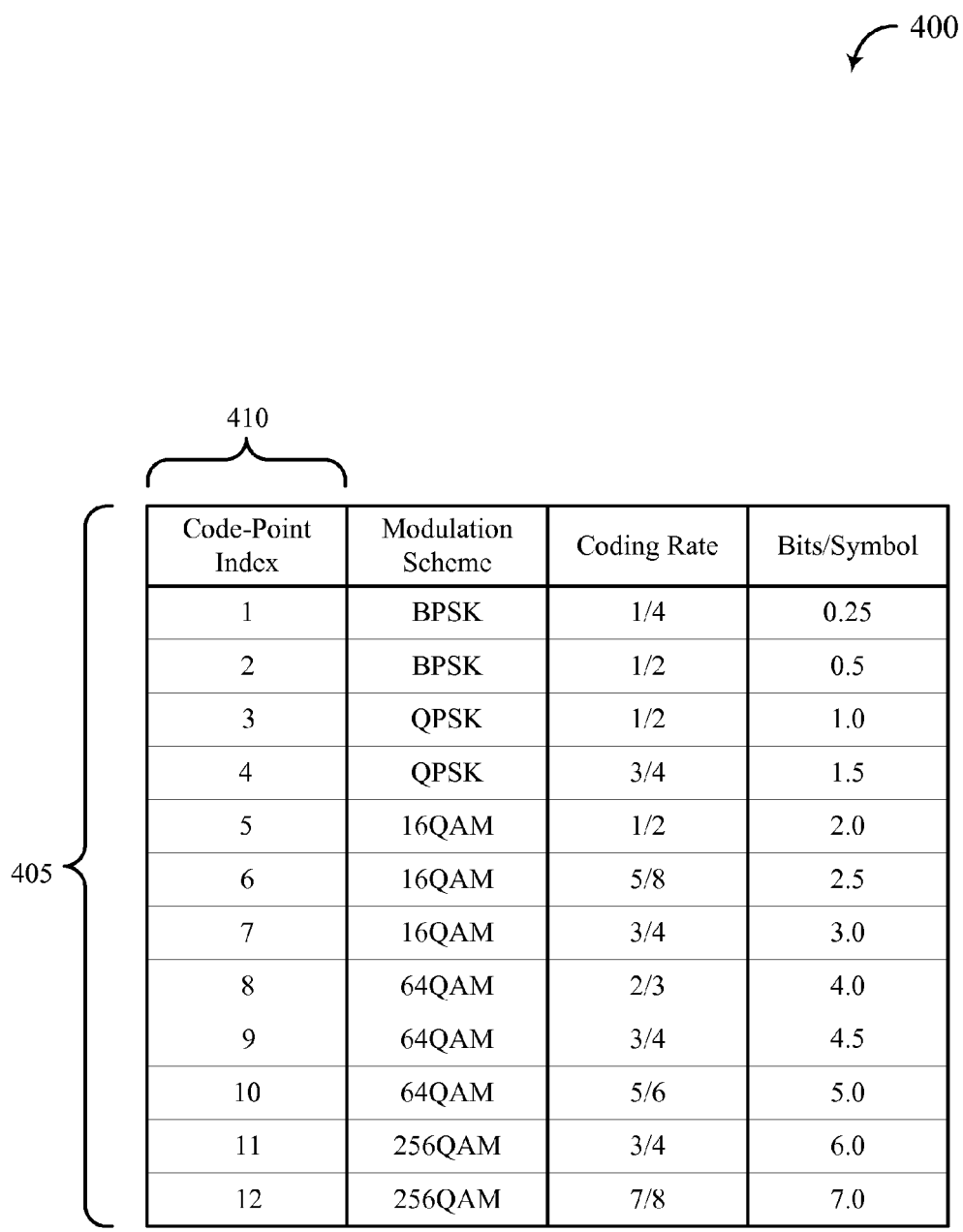
FIG. 4 shows a diagram of an example code-point set in accordance with aspects of the present disclosure.

FIG. 4 shows a diagram 400 of an example code-point set 405 in accordance with aspects of the present disclosure. Code-point set 405 includes multiple code-points organized by a code-point index 410, where each code-point corresponds with a modulation scheme and a coding rate. In the example code-point set 405, the set of code-points includes various modulation schemes (e.g., BPSK, QPSK, 16QAM, 64QAM, 256QAM, etc.) and coding rates that define the spectral efficiency of the respective code-points. The term spectral efficiency, as used herein, refers to the information rate (e.g., in bits-per-second (bps), etc.) transmitted with respect to the bandwidth (e.g., Hertz (Hz), etc.) for the transmission, and may be described in units of bits-per-second-per-Hz (bps/Hz). Alternatively, spectral efficiency may be given in terms of bits-per-symbol (b/S). The symbol rate (e.g., symbols-per-second-per-Hz, etc.) for a particular communication channel may depend on the multiple access technique, carrier modulation technique, and other factors (e.g., guard interval, cyclic prefix, spatial multiplexing, etc.), and may be substantially constant with respect to the time and frequency regions used for transmissions. The information rate or bit rate for a transmission may thus depend on the spectral efficiency of the code-point used for the transmission and the amount of bandwidth of the carrier or channel allocated for the transmission.

Referring back to FIG. 3, diagram 300 may illustrate physical resource allocations for time periods 320 where the communication channel 325 is uncongested. In uncongested conditions, each of the terminals may be allocated physical resources for a time period 320 according to the amount of physical resources that corresponds with their resource request (e.g., in kB of data, etc.), when modulated and coded according to the code-point assigned to the terminal for that time period 320. Because different terminals may be assigned different code-points for a given time period 320, the spectral efficiency for different terminals for communications in the given time period may be different. Thus, similar resource requests from different terminals having different code-points for the given time period may result in different amounts of scheduled physical resource units for fulfilling the requests. Where the communication channel is uncongested, the resource requests for each terminal may be fulfilled without impacting the communications for other terminals over the channel. However, terminals having code-points with lower spectral efficiency may take up a disproportionate amount of physical resources in a given time period.

For various time periods, the communication channel 325 may become congested. For example, for a given time period 320, the aggregate amount of physical resources corresponding to the resource requests of the terminals for the time period and respective code-points associated with the terminals for the time period 320 may exceed the available physical resources of the communication channel 325. When the communication channel becomes congested, not all terminals can be allocated physical resources corresponding to their resource requests for given amounts of data.

Figures 5, 6:
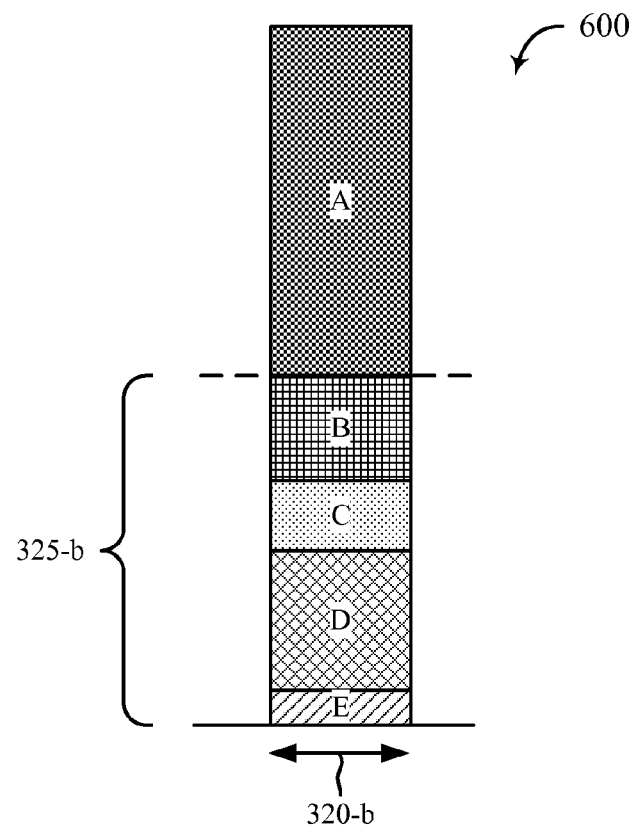
FIG. 5 shows an example table of resource requests for an allocation time period in accordance with aspects of the present disclosure.
FIG. 6 shows a diagram illustrating an example of resource congestion for a shared communication channel in accordance with aspects of the present disclosure.

FIG. 5 shows an example table 500 of resource requests that may be received at scheduler 140 for an allocation time period 320 in the example satellite communications system 100 of FIG. 1. In FIG. 5, example table 500 shows code-points 505 and data requests 510 for Terminals A-E, which may be Terminals A-E of FIG. 1, serviced by a shared communication channel (e.g., service beam, carrier, etc.). As shown in the example table 500, Terminals A, C, and E may each be associated with data requests of 500 bits for a downlink communication channel 325 for a time period 320-b, while Terminal B is associated with a data request of 300 bits and Terminal D is associated with a data request of 1000 bits. For the time period 320-b: Terminal A may be assigned a code-point with a spectral efficiency value of 0.5 bits/symbol; Terminal B may be assigned a code-point with a spectral efficiency value of 1.0 bits/symbol; Terminals C and D may be assigned a code-point with a spectral efficiency value of 2.5 bits/symbol; and Terminal E may be assigned a code-point with a spectral efficiency value of 5.0 bits/symbol. Thus, for the time period 320-b, the number of symbols for servicing the resource requests for Terminals A-E may be determined as 1000 symbols for Terminal A, 300 symbols for Terminal B, 200 symbols for Terminal C, 400 symbols for Terminal D, and 100 symbols for Terminal E.

FIG. 6 shows a diagram 600 illustrating an example of resource congestion for the communication channel 325-b according to the aggregate requested resource units of the example data requests in table 500. For example, communication channel 325-b may have a set of available physical resource units of 1000 symbols in time period 320-b and, as described above, the aggregate demand for symbols in time period 320-b may be 2000 symbols. Thus, for this example the aggregate demand exceeds the available resources.

Figure 7:
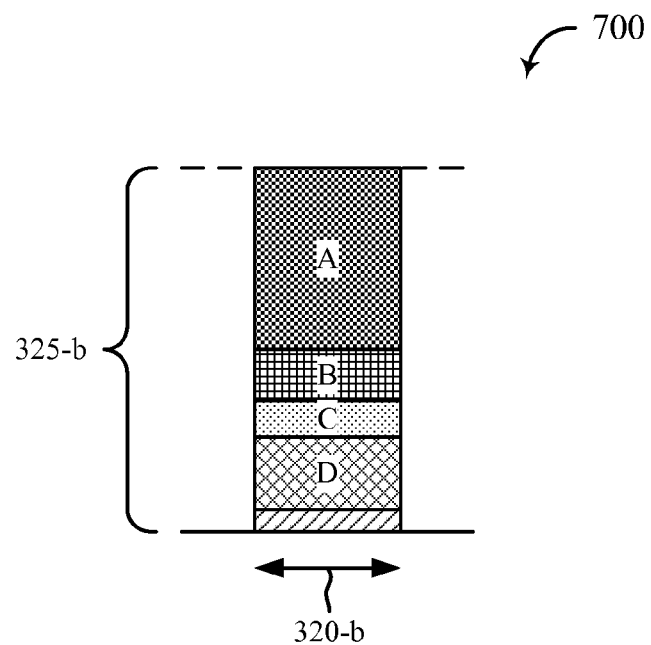
FIG. 7 shows a diagram illustrating an allocation of symbols to terminals according to fair sharing of bits in accordance with aspects of the present disclosure.

If fair sharing of bits is applied to the resource requests in time period 320-b to allocate the physical resources of communication channel 325-b, each resource allocation in bits would be divided by the ratio of available symbols to the aggregate demand. For example, fair sharing of bits would result in allocation of a throughput of 250 bits for Terminal A, 150 bits for Terminal B, 250 bits for Terminal C, 500 bits for Terminal D, and 250 bits for Terminal E. FIG. 7 shows a diagram 700 illustrating the resulting allocation of symbols to Terminals A-E, where each terminal is allocated resources according to fair sharing of bits. For this allocation, Terminal A would be allocated 500 symbols, Terminal B would be allocated 150 symbols, Terminal C would be allocated 100 symbols, Terminal D would be allocated 200 symbols, and Terminal E would be allocated 50 symbols. The total data throughput of the communication channel for time period 320-b would be 1400 bits.

Figure 8:
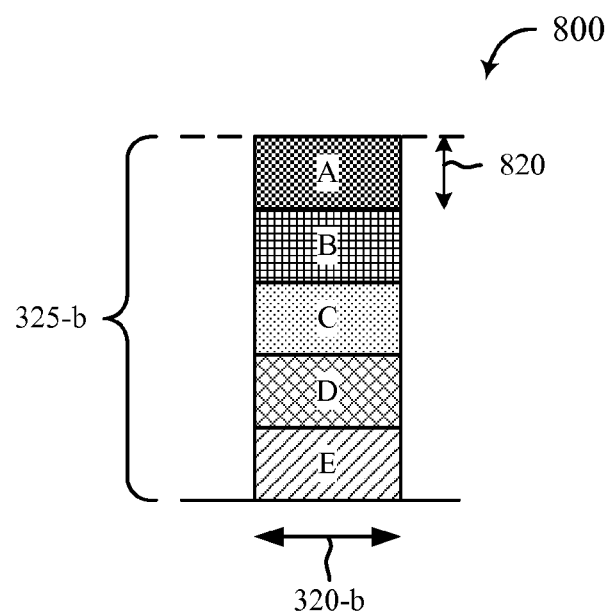
FIG. 8 shows a diagram illustrating an example allocation of symbols to terminals using fair-sharing of symbols in accordance with aspects of the present disclosure.

According to aspects of the present techniques, under the above scenario, fair sharing of symbols may be applied for resource allocation of time period 320-b to result in a more desirable allocation of resources. FIG. 8 shows a diagram 800 illustrating the resulting allocation of symbols to Terminals A-E for an example of fair-sharing of symbols. Diagram 800 shows fair sharing of symbols where, for example, each terminal may have enough data to send in order to take up their full allocation according to fair sharing of symbols. As illustrated in diagram 800, fair sharing of symbols results in each terminal being allocated a proportionate share 820 of symbols for time period 320-b. The proportionate share 820 of symbols allocated to each terminal may thus be allocated independent of the spectral efficiency values of the respective assigned code-points for the terminals. In the illustrated example, the proportionate share 820 is equal to 200 symbols. According to the code-points for time period 320-b in table 500, Terminal A would have an effective throughput of 100 bits, Terminal B would have an effective throughput of 200 bits, Terminals C and D would have an effective throughput of 500 bits, and Terminal E would have an effective throughput of 1000 bits. Thus, where each terminal has enough data to take up their full allocation according to fair sharing of symbols, the total data throughput using fair sharing of symbols would be 2300 bits.

While the effective throughput for some terminals is reduced when compared to fair sharing of bits, fair sharing of symbols as shown in diagram 800 results in a higher overall throughput of the communication channel 325-b.

In the example table 500, Terminal E requests only 500 bits for time period 320-b, and therefore would not use its entire allocation under fair sharing of symbols of 200 symbols. Thus, fair sharing of symbols may be applied to a subset of Terminals A-E in various embodiments. For example, fair sharing of symbols may be applied to those terminals having code-points with spectral efficiency values below a threshold value. Additionally or alternatively, fair sharing of symbols may be applied for those terminals whose resource requests would result in allocations of symbols exceeding a proportionate share of symbols.

Figure 9:
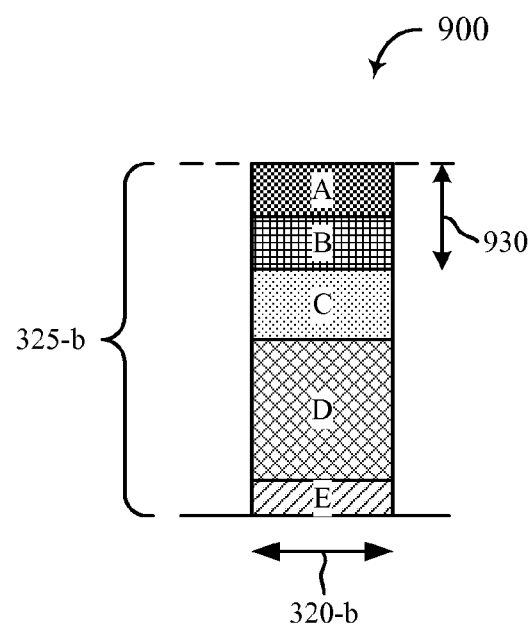
FIG. 9 shows a diagram illustrating an example resource allocation to terminals using fair sharing of symbols for terminals having assigned code-points with spectral efficiency values below a threshold in accordance with aspects of the present disclosure.

FIG. 9 shows a diagram 900 illustrating an example of resource allocation with fair sharing of symbols applied to terminals assigned to code-points having spectral efficiency values below 2.0 bits/symbol (e.g., Terminals A and B). In this example, Terminals C, D, and E may be allocated a number of symbols according to their resource requests from table 500. As illustrated in diagram 900, this may result in a set of remaining resources 930 to be allocated to Terminals A and B. Thus, the remaining resources 930, which may be 300 symbols, may be split equally among Terminals A and B. The resulting symbol allocations would be 100 symbols for Terminal E, 400 symbols for Terminal D, 200 symbols for Terminal C, and 150 symbols for each of Terminals A and B. The resulting data throughputs for time period 320-b would be 75 bits for Terminal A, 150 bits for Terminal B, 500 bits for Terminal C, 1000 bits for Terminal D, and 500 bits for Terminal E. Thus, the total data throughput for the communication channel 325-b for the time period 320-b would be 2225 bits.

Figure 10:
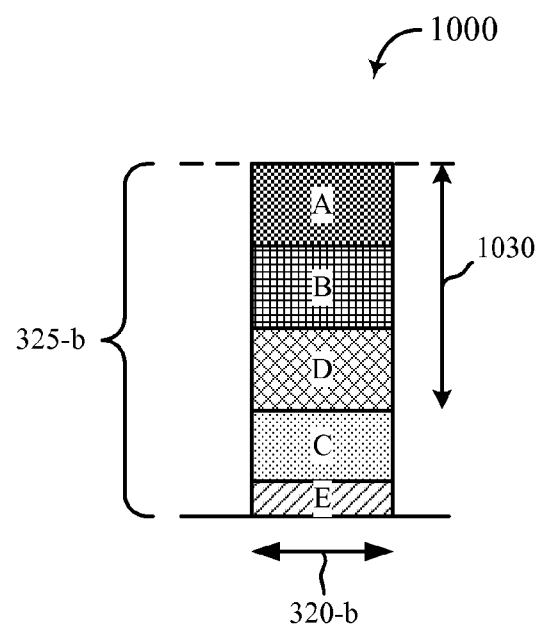
FIG. 10 shows a diagram illustrating an example resource allocation to terminals using fair sharing of symbols applied to terminals requesting more than a proportionate share of symbols in accordance with aspects of the present disclosure.

FIG. 10 shows a diagram 900 illustrating an example of resource allocation with fair sharing of symbols applied to terminals requesting more than a proportionate share of symbols. For example, a proportionate share of symbols for channel 325-b may be 200 symbols. As is shown in FIG. 6, Terminals C and E have resource requests according to their respective data requests and code-points for time period 320-b that result in less than a proportionate share of symbols. Thus, these terminals may be allocated a number of symbols according to their resource requests from table 500. As illustrated in diagram 1000, this may result in a set of remaining resources 1030 to be allocated to Terminals A, B, and D. Thus, the remaining resources 1030, which may be 700 symbols, may be split equally among Terminals A, B, and D. The resulting symbol allocations would be 233 symbols for each of Terminals A, B, and D, 200 symbols for Terminal C, and 100 symbols for Terminal E. The resulting data throughputs for time period 320-b would be 116.5 bits for Terminal A, 233 bits for Terminal B, 500 bits for Terminal C, 582.5 bits for Terminal D, and 500 bits for Terminal E. Thus, the total data throughput for the communication channel 325-b for the time period 320-b would be 1932 bits. Fair sharing of symbols applied to terminals requesting more than a proportionate share of symbols may be used to ensure that all terminals get at least a proportionate share of the symbols.

In some examples, whether fair sharing of symbols is applied to particular terminals depends on other factors. For example, fair sharing may be applied to terminals having code-points with low spectral efficiency values as a result of a determined operating condition. The operating condition may be determined based on an analysis of parameters associated with the terminal. For example, terminals towards the edge of a particular coverage area may have lower SNR due to the reception strength of signals transmitted from the satellite. Additionally or alternatively, a terminal at a given location may have a code-point for transmissions (e.g., forward link, return link, downlink, uplink, etc.) that has low spectral efficiency due to antenna pointing error. Whether location or antenna pointing error is causing a low spectral efficiency code-point for a particular terminal may therefore be determined by an analysis of the location of the terminal (which may be associated with an expected code-point) compared to the code-point assigned based on link measurements between the satellite and the terminal. Additionally or alternatively, rain fade may be determined to be the cause of a low spectral efficiency code-point where the code-point varies with time or other indications of atmospheric precipitation are identified.

In some examples, fair sharing of symbols may be applied to terminals experiencing various operating conditions (e.g., location, antenna pointing error, rain fade, etc.) and/or having low spectral efficiency code-points. For example, fair sharing of symbols may be applied to terminals having code-points below a spectral efficiency threshold that are determined to be caused by pointing error but not to terminals having code-points below the spectral efficiency threshold that are determined to be caused primarily by location and/or rain fade. This may encourage users associated with terminals having antenna pointing error to re-point their antennas to improve their user experience. In other cases, fair sharing of symbols may be applied to terminals having code-points below a spectral efficiency threshold that are determined to be caused by rain fade but not other operating conditions. For example, users may be more tolerant of temporary impacts to their user experience such as may be caused by changes in link quality due to atmospheric conditions.

Additionally or alternatively, allocation for a shared communication channel may be according to a combination of fair sharing of bits and fair sharing of symbols. For example, when the communication channel is congested, a bit-rate threshold may first be applied to resource requests to generate rate-restricted resource requests. The bit-rate threshold may be based on a specified service level (e.g., MinIR, CIR, PIR, etc.) and/or an amount of congestion. For example, the bit-rate threshold may be inversely proportional to the amount of congestion using an appropriate factor. After a bit-rate threshold is applied, the techniques for fair sharing of symbols discussed above with reference to FIGS. 9 and 10 may be applied to determine which terminals to apply fair sharing of symbols and to allocate symbols for the channel.

Figures 11, 12:
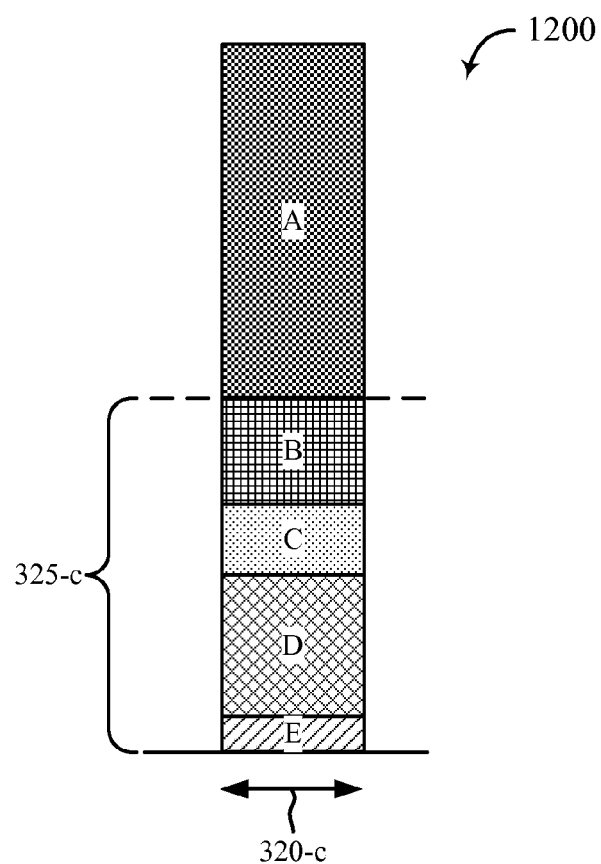
FIG. 11 shows a table illustrating example service levels, code-points, and data requests for a set of terminals serviced by a communication channel in accordance with aspects of the present disclosure.
FIG. 12 shows a diagram illustrating an example of resource congestion for a shared communication channel in accordance with aspects of the present disclosure

In some examples, fair sharing of symbols may be applied according to service levels associated with the terminals. FIG. 11 shows an example table 1100 of provisioned service levels 1115, code-points 505-a, and data requests 510-a for a set of terminals serviced by a communication channel. As shown in table 1100, Terminals A-E may be provided communication service in a communication system (e.g., the communications system of FIG. 1, etc.) according to varying service levels.

Table 1100 illustrates relative service levels for Terminals A-E. For example, Terminals A and C may have a first service level and Terminals B, D, and E may have a second service level with a service level having a factor of 2.0 relative to the first service level. That is, the second service level, when normalized by a base service level unit, may have a service level factor of 2.0, while the first service level may have a service level factor of 1.0. For example, Terminals A and C may have a service level agreement with a service data rate (e.g., MinIR, CIR, PIR, etc.) of 5 Megabits per second (Mbps) while Terminals B, D, and E may have a service level agreement with a service data rate of 10 Mbps.

As illustrated in table 1100, assigned code-points and resource requests for a communication channel 325 for a time period 320 may be the same as in table 500 of FIG. 5. FIG. 12 shows a resource diagram 1200 illustrating an example of resource congestion for a communication channel 325-*c* according to the aggregate requested resource units of the example data requests in table 1100. For example, communication channel 325-*c* may have an available bandwidth of 1000 symbols in time period 320-*c* and the aggregate demand for symbols in time period 320-*c* may be 2000 symbols.

Figure 13:
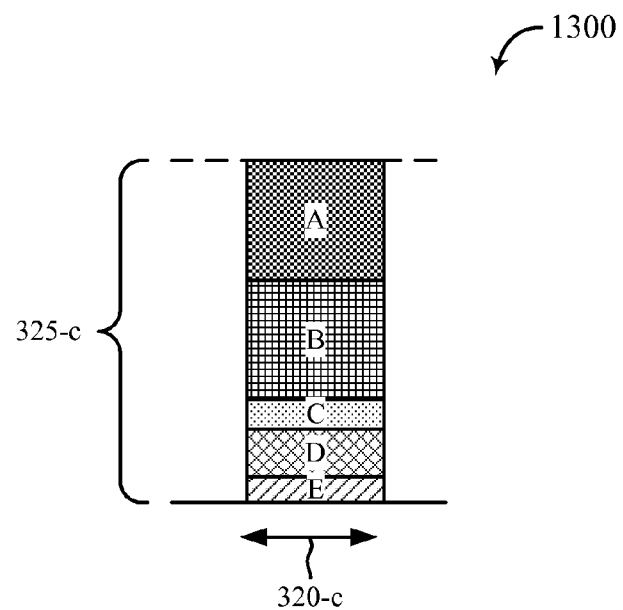
FIG. 13 shows a diagram illustrating an example allocation of resources for a shared communication channel using fair sharing of bits according to service levels in accordance with aspects of the present disclosure.

FIG. 13 shows a diagram 1300 illustrating an example of allocation of resources of channel 325-*c* using fair sharing of bits according to service levels. Fair sharing of bits according to service levels would result in allocation of approximately 178.5 bits for terminals with a service level factor of 1.0 and 357 bits for terminals with a service level factor of 2.0. Thus, fair sharing of bits according to service levels would result in a throughput for time period 320-*c* of approximately 178.5 bits for Terminals A and C, and 357 bits for Terminals B, D, and E. The resulting symbol allocations would be 357 symbols for Terminals A and B, 71.4 symbols for Terminal C, 142.8 symbols for Terminal D, and 71.4 symbols for Terminal E. The total throughput for time period 320-*c* using fair sharing of bits according to service levels would be 1428 bits.

Figure 14:
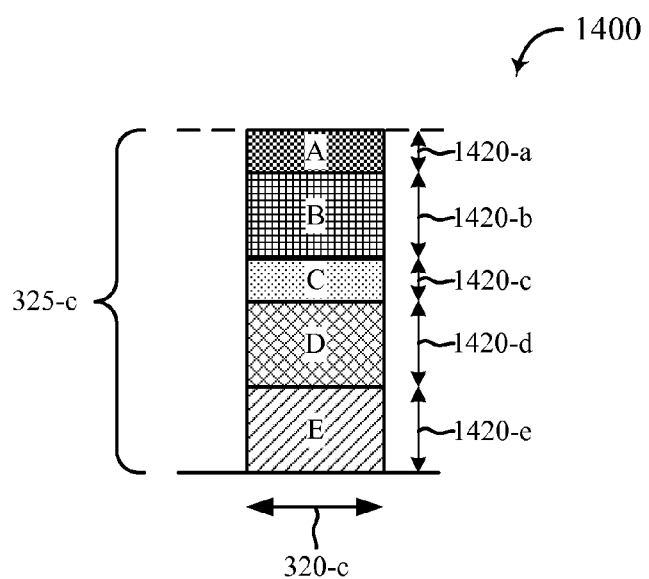
FIG. 14 shows a diagram illustrating an example of fair sharing of symbols for a shared communication channel according to service levels in accordance with aspects of the present disclosure.

Fair sharing of symbols according to service levels may be applied to a subset of terminals or to all terminals, in some cases. FIG. 14 shows a diagram 1400 illustrating an example of fair sharing of symbols according to service levels for Terminals A-E. In diagram 1400, each terminal is allocated a portion of symbols of the channel 325-*c* that is in proportion to the service level factors shown in table 1100. Thus, the ratio of proportionate shares 1420-*b*, 1420-*d*, and 1420-*e* for Terminals B, D, and E, respectively in relation to the proportionate shares 1420-*a* and 1420-*c* for Terminals A and C, respectively, may be equal to the ratio of the service level factors for these terminals. Thus, for this example, Terminals A and C are allocated 125 symbols each and Terminals B, D, and E are allocated 250 symbols each for time period 320-*c*. The resulting effective data throughputs for symbol period 320-*c* would be 62.5 bits for Terminal A, 250 bits for Terminal B, 312.5 bits for Terminal C, 625 bits for Terminal D, and 1250 bits for Terminal E. Thus, the total data throughput for the communication channel 325-*c* for the time period 320-*c* would be 2500 bits.

In some examples, whether fair sharing of symbols according to service levels is applied to particular terminals may depend on whether an assigned code-point for the terminal is below a spectral efficiency threshold and/or whether the low spectral efficiency code-point is caused by one or more operating conditions such as location, antenna pointing error, or rain fade.

Figure 15:
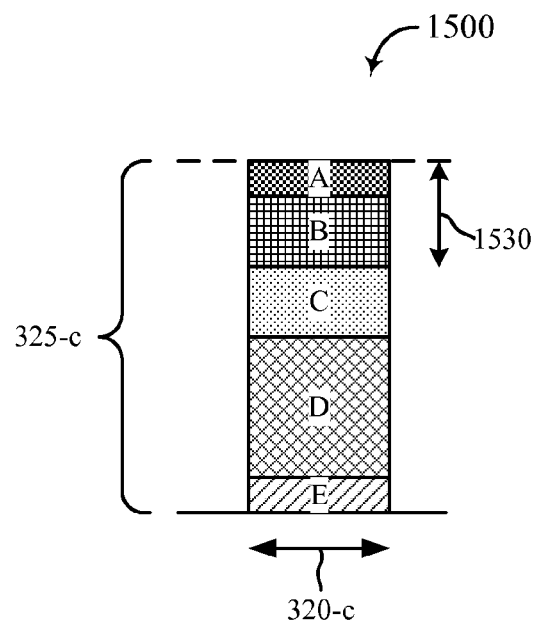
FIG. 15 shows a diagram illustrating an example of fair sharing of symbols according to service levels applied to terminals having code-points with spectral efficiency values below a threshold value in accordance with aspects of the present disclosure.

FIG. 15 shows a diagram 1500 illustrating an example of fair sharing of symbols according to service levels applied to those terminals having code-points with spectral efficiency values below a threshold value. Referring back to FIG. 11 for example, fair sharing of symbols according to service levels may be applied to a subset of terminals assigned to code-points having spectral efficiency values below 2.0 bits/symbol (e.g., Terminals A and B). Thus, resources may be allocated to terminals C, D, and E based on the respective requested resources and code-points for these terminals. As illustrated in FIG. 15, remaining resources 1530 may be allocated to Terminals A and B such that Terminal B is allocated twice the number of symbols as Terminal A. The resulting symbol allocations would be 100 symbols to Terminal A, 200 symbols to Terminal B, 200 symbols to Terminal C, 400 symbols to Terminal D, and 100 symbols to Terminal E. The resulting effective data throughputs for symbol period 320-*c* would be 50 bits for Terminal A, 200 bits for Terminal B, 500 bits for Terminal C, 1000 bits for Terminal D, and 500 bits for Terminal E. Thus, the total data throughput for the communication channel 325-*c* for the time period 320-*c* would be 2250 bits.

Additionally or alternatively, fair sharing of symbols according to service levels may be applied for those terminals whose resource requests would result in allocations of symbols exceeding a service level proportionate share of symbols. Returning to FIG. 14, service level proportionate shares 1420 of diagram 1400 indicate shares of symbols of channel 325-*c* in proportion to the service levels shown in table 1100. Thus, service level proportionate shares 1420-*a* and 1420-*c* for Terminals A and C, respectively, may be half of service level proportionate shares 1420-*b*, 1420-*d*, and 1420-*e* for Terminals B, D, and E, respectively.

Figure 16:
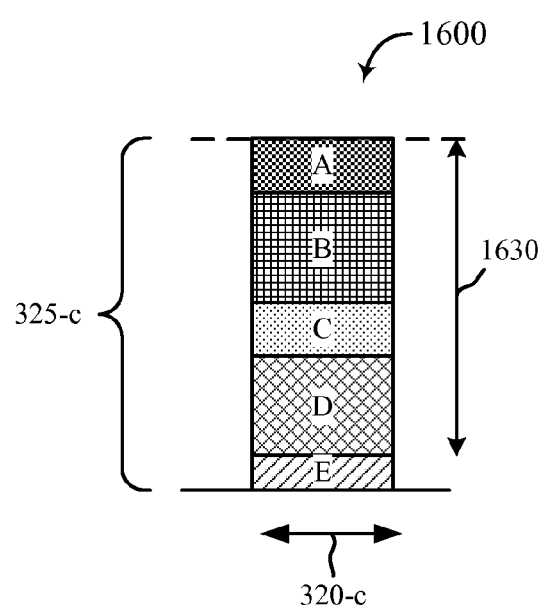
FIG. 16 shows a diagram illustrating an example of fair sharing of symbols according to service levels applied to terminals requesting more than a service level proportionate share in accordance with aspects of the present disclosure.

FIG. 16 shows a diagram 1600 illustrating an example of fair sharing of symbols according to service levels applied to terminals requesting more than a service level proportionate share. The resource request for Terminal E results in an allocation of symbols of communication channel 325-*c* that is less than or equal to a service level proportionate share 1420. Thus, Terminal E may be allocated a number of symbols to satisfy its resource request at its assigned code-point. As illustrated in diagram 1600, this may result in a set of remaining resources 1630 to be allocated to Terminals A, B, C, and D. The remaining resources 1630 may be allocating by fair sharing of symbols according to service levels to the terminals whose resource requests would result in allocations of symbols exceeding their service level proportionate shares of symbols (e.g., Terminals A, B, C, and D). Thus, the remaining resources 1630, which may be 900 symbols, may be shared according to service levels among Terminals A, B, C, and D. The resulting symbol allocations would be 150 symbols each to Terminals A and C, 300 symbols each to Terminals B and D, and 100 symbols to Terminal E. The resulting effective data throughputs for symbol period 320-*c* would be 75 bits for Terminal A, 300 bits for Terminal B, 375 bits for Terminal C, 750 bits for Terminal D, and 500 bits for Terminal E. Thus, the total data throughput for the communication channel 325-*c* for the time period 320-*c* would be 2000 bits.

In some examples, data rate thresholds may be applied to fair sharing of symbols. The data rate thresholds may be determined by or may be proportionate to a service level (e.g., MinIR, CIR, PIR, etc.). For example, terminals for which the data rate may fall below a data rate threshold as a result of applying fair sharing of symbols may be allocated resources corresponding to the data rate threshold. Data rate thresholds and fair sharing of symbols may be applied iteratively to result in a final allocation.

It should be understood that the resource requests, channel resources, and resource allocations illustrated in FIGS. 5-16 are simplified examples of resource allocations for the purposes of description. For example, the described resource allocations may be approximate resource allocations and may be adjusted for conformity with sizes of packet data or allocatable physical resources.

Figure 17:
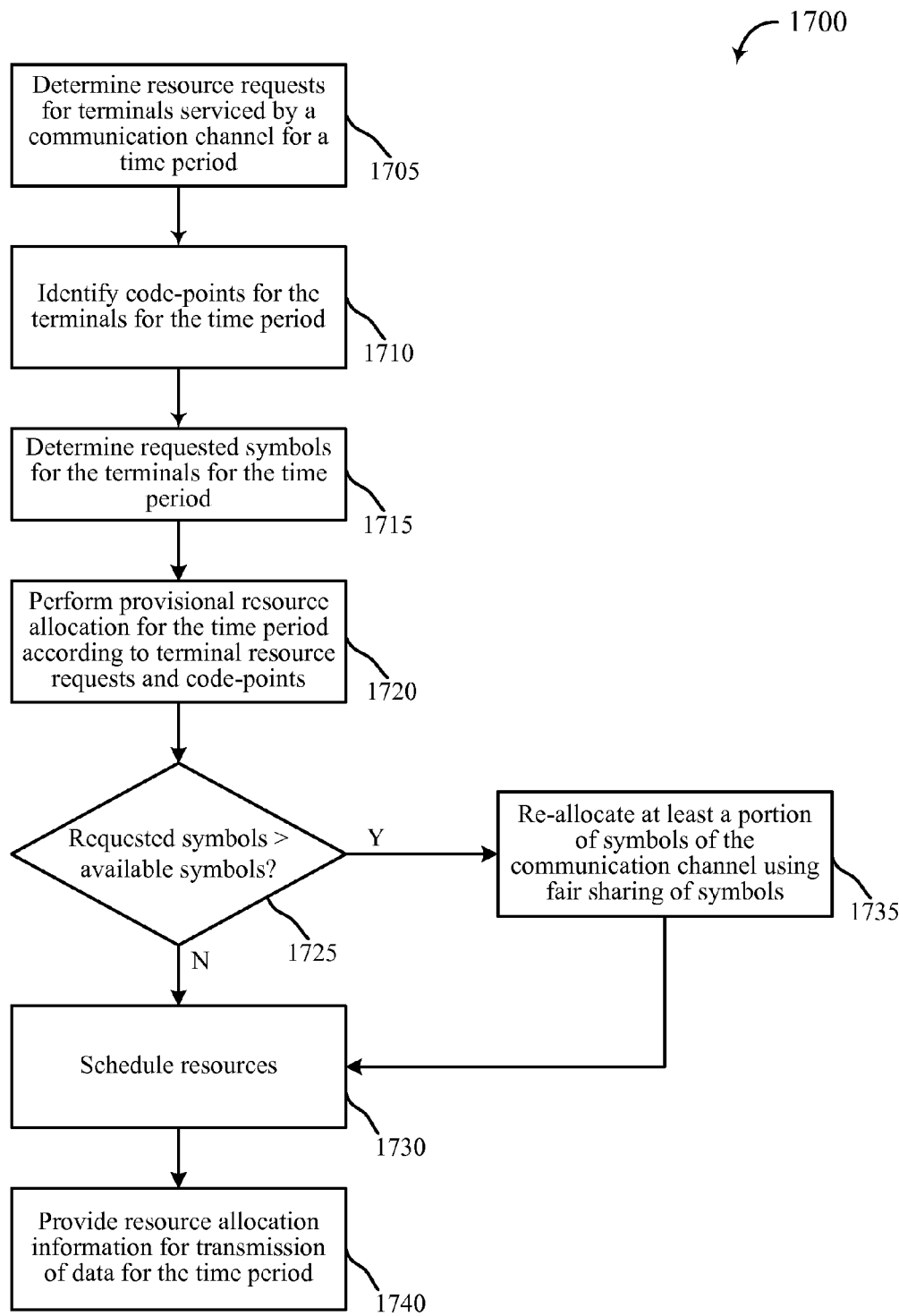
FIG. 17 shows a method for fair sharing of symbols in a communication system in accordance with various embodiments.

FIG. 17 shows a method 1700 for fair sharing of symbols in a communication system in accordance with various embodiments. The method 1700 may be performed by aspects of the system 100 of FIG. 1 for allocation of physical resources of a shared communication channel (e.g., beam, carrier, frequency band, etc.) for an allocatable time period (e.g., epoch, frame, sub-frame, slot, symbol period, etc.). For example, the method 1700 may be performed by the schedulers 140 of FIG. 1 and/or FIG. 19, the device 2005 of FIG. 20, and/or the scheduling server 2205 of FIG. 22 for allocation of symbols of a communication channel of service beam 125 or gateway beam 115. Thus, these components may be means for performing the functions of method 1700.

Method 1700 may begin at block 1705 where resource requests may be determined for terminals serviced by a communication channel for a time period. The resource requests may include, for example, requests for amounts of data (e.g., bits, bytes, kb, kB, etc.) and/or a data rate (e.g., bits per second, kb per second, kB per second, etc.) for data communications (e.g., downlink, uplink, forward link, return link, etc.) in the time period. The requests may also be in the form of a queue size or other parameter associated with communication sessions of the terminals. In some examples, various protocols such as acceleration and/or traffic shaping may also be applied in determining resource requests for the time period. Additionally or alternatively, a service rate (e.g., MinIR, CIR, PIR, etc.) may be applied in determining resource requests for the time period. For example, resource requests may be determined based on a queue size and a service rate for each terminal.

At block 1710, code-points for communication via the communication channel may be identified for the terminals for the time period. For example, the scheduler may receive information related to assigned code-points for the terminals, which may be assigned statically, semi-statically, or dynamically (e.g., based on measurements of link conditions, etc.). In some examples, a modem may use ACM for the communication channel and each terminal may be assigned a code-point (e.g., for forward link, return link, downlink, uplink, etc.) based on measurements of link conditions and a target error rate.

At block 1715, amounts of requested symbols of the communication channel corresponding to the resource requests of the terminals at the respective code-points for the terminals may be determined.

At block 1720, a provisional resource allocation may be performed according to the amounts of requested symbols for the terminals for the time period. If, at block 1725, the aggregate demand for symbols according to the amounts of requested symbols is less than or equal to the available symbols of the communication channel, the provisional resource allocation may be used to schedule resources for the communication channel at block 1730.

If, however, the aggregate demand for symbols according to the amounts of requested symbols is greater than or equal to the available symbols of the communication channel at block 1725, re-allocation of at least a portion of the symbols of the communication channel may be performed using fair sharing of symbols at block 1735.

Fair sharing of symbols at block 1735 may include, for example, performing fair sharing of symbols for a subset of terminals or for all terminals serviced by the communication channel. In some examples, each terminal may be allocated a proportionate share of symbols of the communication channel for the time period and data may be scheduled at block 1730 according to amounts of data that can be carried for respective terminals according to their respective code-points and fair share symbol allocations. The proportionate shares of symbols allocated to each terminal may thus be independent of the spectral efficiency values associated with the respective assigned code-points for the terminals. The proportionate shares may be determined, for example, by dividing the symbols available for fair sharing equally among the terminals to be allocated resources using fair sharing of symbols. In some examples, fair sharing of symbols may be according to service level of the terminals. For example, terminals may be allocated service level proportionate shares of the symbols of the communication channel for the time period.

At block 1740, the scheduler may provide resource allocation information for transmission of data in the time period. For example, the scheduler may provide resource scheduling to components of the gateway system or satellite for forward link transmission of data via the communication channel (e.g., carrier, etc.). The gateway system or satellite may perform coding and modulation of data according to the code-points for the terminals using the resource scheduling for the time period and transmit the data in the communication channel. For return link transmissions from the terminals, the scheduler may provide scheduling information (e.g., resource blocks, symbols, sub-channels, sub-carriers, etc.) of symbols allocated to the terminals for the time period to the respective terminals. The terminals may perform coding and modulation of data according to their assigned code-point and transmit the data in the assigned physical resources in the time period.

It can be understood that fair sharing of symbols may be used to allocate additional resources even when the communication channel is determined to be uncongested at block 1725. For example, resource requests for terminals may depend on a queue size associated with a terminal and a service rate (e.g., MinIR, CIR, PIR, etc.). Where the queue sizes for the terminals are larger than the amount of data that can be sent in a particular time interval according to the service rate, the service rate may effectively determine the size of the resource requests for the time interval. Thus, where the communication channel has additional resources after each terminal has been provisionally allocated according to the service rate, fair sharing of symbols may be applied to allocate additional resources to those terminals having additional data to send. Fair sharing of symbols for the additional resources may be applied for all terminals having additional data to send or for a subset of terminals (e.g., assigned to low spectral efficiency code-points, etc.). Additionally or alternatively, high service rate thresholds may be applied for allocation of the additional resources. For example, if fair sharing of symbols would result in one or more terminals receiving allocations that, at their respective code-points, would result in an effective data rate higher than a high service rate threshold (e.g., PIR, etc.), the additional resources to be allocated to the terminal may be capped at the high service rate threshold and the excess resources re-allocated to the other terminals according to the described techniques.

Figure 18:
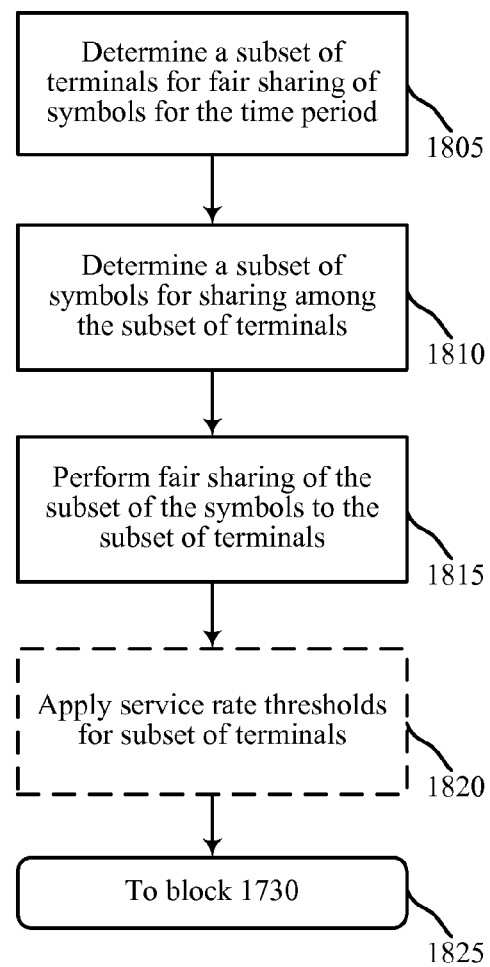
FIG. 18 shows a method for re-allocation of symbols in a communication system using fair sharing in accordance with various embodiments.\

FIG. 18 shows a method 1800 for re-allocation of symbols in a communication system using fair sharing in accordance with various embodiments. The method 1800 may be performed by aspects of the system 100 of FIG. 1 for allocation of physical resources of a shared communication channel (e.g., beam, carrier, frequency band, etc.) for an allocatable time period (e.g., epoch, frame, sub-frame, slot, symbol period, etc.). For example, the method 1800 may be performed by the schedulers 140 of FIG. 1 and/or FIG. 19, the device 2005 of FIG. 20, and/or the scheduling server 2205 of FIG. 22 for allocation of symbols of a communication channel of service beam 125 or gateway beam 115. Thus, these components may be means for performing the functions of method 1800.

At block 1805 of method 1800, a subset of terminals for fair sharing of symbols for the time period may be determined. The subset of terminals may be determined as those terminals having respective code-points below a spectral efficiency threshold. In some examples, fair sharing of symbols may be applied to those terminals having respective code-points with low spectral efficiency, where the low spectral efficiency is determined to be caused by an operating condition such as a location of the terminal within a coverage area of a service beam, antenna pointing error, rain fade, and/or other operating conditions. The subset of terminals may be determined as those terminals requesting more symbols than a proportionate share or service level weighted proportionate share of symbols for the terminal.

At block 1810, a subset of symbols for fair sharing among the subset of terminals may be determined. For example, the subset of symbols may be symbols remaining after allocation of symbols to the terminals having respective code-points with spectral efficiencies exceeding the spectral efficiency threshold.

Additionally or alternatively, various service rate parameters may be considered in determining the subset of symbols for fair sharing among the subset of terminals at blocks 1805 and 1810. For example, service rate thresholds (e.g., MinIR, CIR, PIR, etc.) may be applied to data rate requests prior to performing a provisional allocation according to data requests and respective code-points. Thus, the service rate threshold adjusted data requests may be used to determine the subset of terminals and subset of symbols for fair sharing among the subset of terminals.

At block 1815, the subset of symbols may be re-allocated to the subset of terminals using fair sharing of symbols. For example, each terminal of the subset of terminals may be allocated a proportionate share of the subset of symbols. The proportionate shares may be determined based on the amount of symbols in the subset of symbols in relation to the number of terminals in the subset of terminals. For example, the amount of symbols in the subset of symbols may be split into proportionate shares (e.g., equal shares, etc.) to be allocated to the subset of terminals. As the amount of symbols may be allocated by fair sharing of the subset of symbols, the respective re-allocated shares may be independent of respective spectral efficiency values associated with the respective code-points for the subset of the terminals.

In some examples, fair sharing of symbols may be according to service level of the terminals. For example, each terminal of the subset of terminals may be allocated a service level proportionate share of the subset of symbols. The subset of terminals may each be associated with a service level factor (e.g., a service rate normalized by a base service level unit, etc.) and the amount of symbols in the subset of symbols may be divided into a number of normalized service level portions corresponding to each normalized service level unit. Assigning each terminal of the subset of terminals to an amount of symbols equal to its service level factor multiplied by the normalized service level portion may result in service level proportionate fair sharing for the subset of terminals.

Optionally, service rate thresholds may be applied for the subset of terminals at block 1820. For example, the re-allocation of the subset of symbols at block 1815 may result in one or more terminals of the subset of terminals having an effective bit rate that is below a service rate threshold (e.g., MinIR, CIR, etc.). At block 1820, terminals having an effective bit-rate lower than the service rate threshold as a result of fair sharing of symbols may be re-allocated resources to provide for an effective bit rate of the service rate threshold. Blocks 1810, 1815 and 1820 may be performed iteratively to determine fair sharing of symbols with bit rate thresholds for the subset of terminals.

At block 1825, the method may have re-allocated the subset of resources and resources may be scheduled for the time period by, for example, returning to block 1735 of the method 1700 illustrated in FIG. 17.

Figure 19:
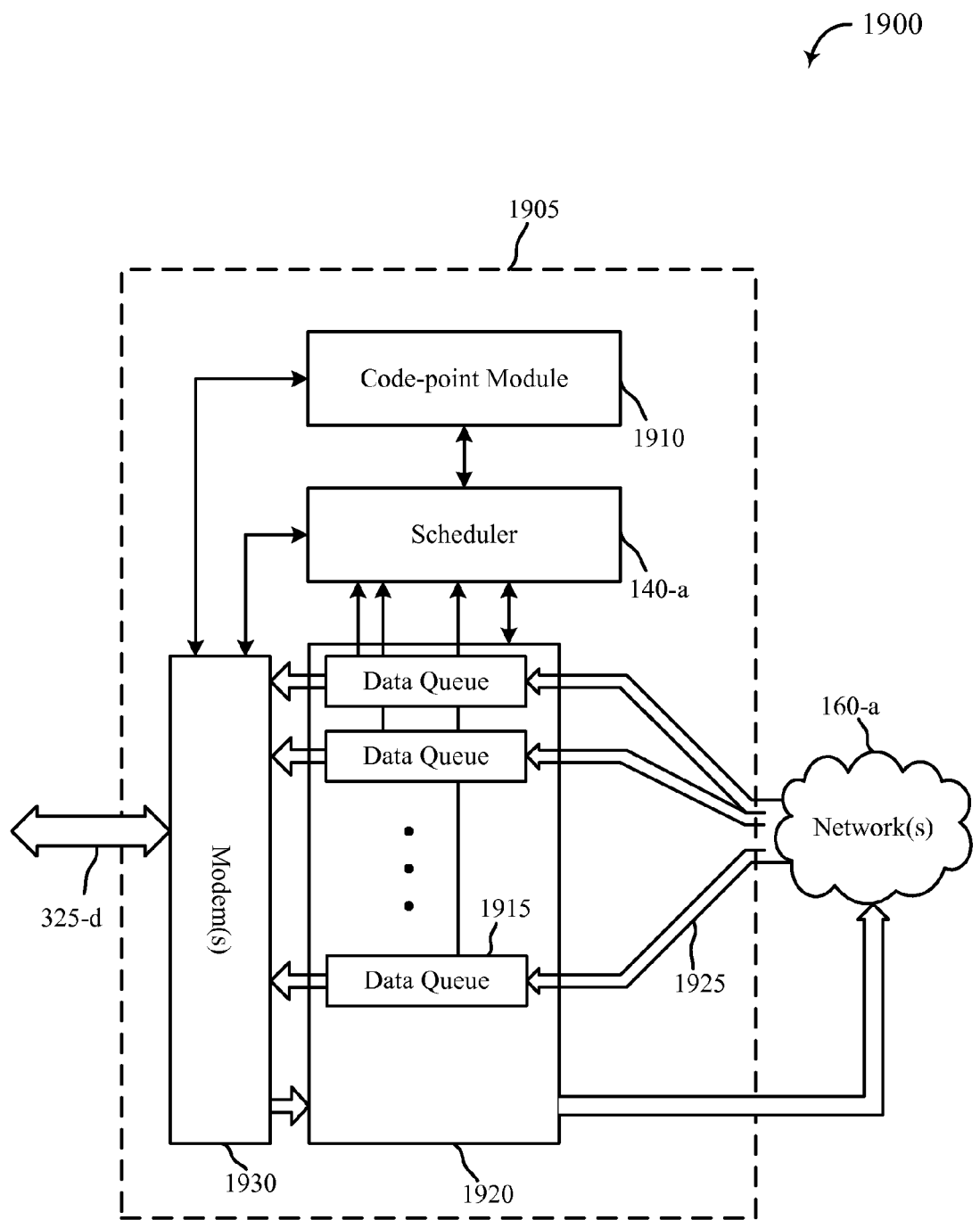
FIG. 19 shows a block diagram of a system that may be employed for fair sharing of symbols in accordance with various aspects of the present disclosure.

FIG. 19 shows a block diagram 1900 of a system 1905 that may be employed for fair sharing of symbols in a communication system in accordance with various aspects of the present disclosure. In some examples, system 1905 may illustrate aspects of satellite 105 and/or gateway system 110 of FIG. 1. System 1905 may include code-point module 1910, data processing module 1920, one or more satellite modem(s) 1930, and scheduler 140-*a*. Each of these modules may be communicatively coupled with any of the other modules of system 1905.

The satellite modem(s) 1930 may provide some or all of the physical, link, and MAC layer functions for signals transmitted from the system 1905, and/or for signals received at the system 1905 from terminals 150 or from a satellite 105. A variety of functions may be performed by the modems 1930, such as modulation, demodulation, coding, decoding, framing, multiple access, frequency and/or power management, terminal acquisition, terminal synchronization support and link quality measurements (e.g., measuring frequency, timing, or power of one or more received signals from terminals 150, etc.), packet segmentation and reassembly, and the like.

The code-point module 1910 may determine code-points for terminals 150 serviced by the system 1905. For example, the code-point module 1910 may receive link quality measurements and/or other information from the modem(s) 1930 and may assign code-points for transmissions (e.g., forward link, return link, downlink, uplink, etc.) to the terminals 150. The code-point module 1910 may statically assign code-points to the terminals, or employ ACM or VCM, in some cases.

The data processing module 1920 may process forward link data traffic 1925 received at the system 1905 from the network(s) 160-*a*. The network(s) 160-*a* may be the network (s) 160 of FIG. 1. The data processing module 1920 may perform queuing of the data traffic in data queues 1915. Additionally or alternatively, the data processing module 1920 may perform traffic shaping and/or acceleration of the forward link data traffic 1925 for transmission of the forward link data traffic 1925 to the terminals via shared communication channels 325-*d*. The data processing module 1920 may receive return link data from the modem(s) 1930 and may process the return link data (e.g., re-formatting, de-acceleration, etc.) and send the data to a data sink in the network(s) 160-*a*.

The scheduler 140-*a* may perform scheduling and resource allocation for shared communication channels 325-*d*. For example, the scheduler 140-*a* may receive resource requests for allocation time periods (e.g., frames, subframes, time slots, bursts, epochs, etc.). For example, the scheduler 140-*a* may receive resource request input from the data processing module 1920 for forward link data traffic 1925 or from terminals 150 for return link data traffic as described above.

The scheduler 140-*a* may perform resource allocation of physical resource units (e.g., symbols, etc.) of the shared communication channels 325-*d* to the terminals serviced by the channels for allocation time periods. The scheduler 140-*a* may employ fair sharing of symbols for some or all terminals serviced via the shared communication channels, and may employ fair sharing according to service levels. The scheduler 140-*a* may output physical resource assignment information to the modem(s) 1930 and/or data processing module 1920, which may be in the form of amounts of physical resource units to be allocated to each terminal for each allocation time period. The physical resource assignment information may be communicated to the terminals by the modem(s) 1930.

Figure 20:
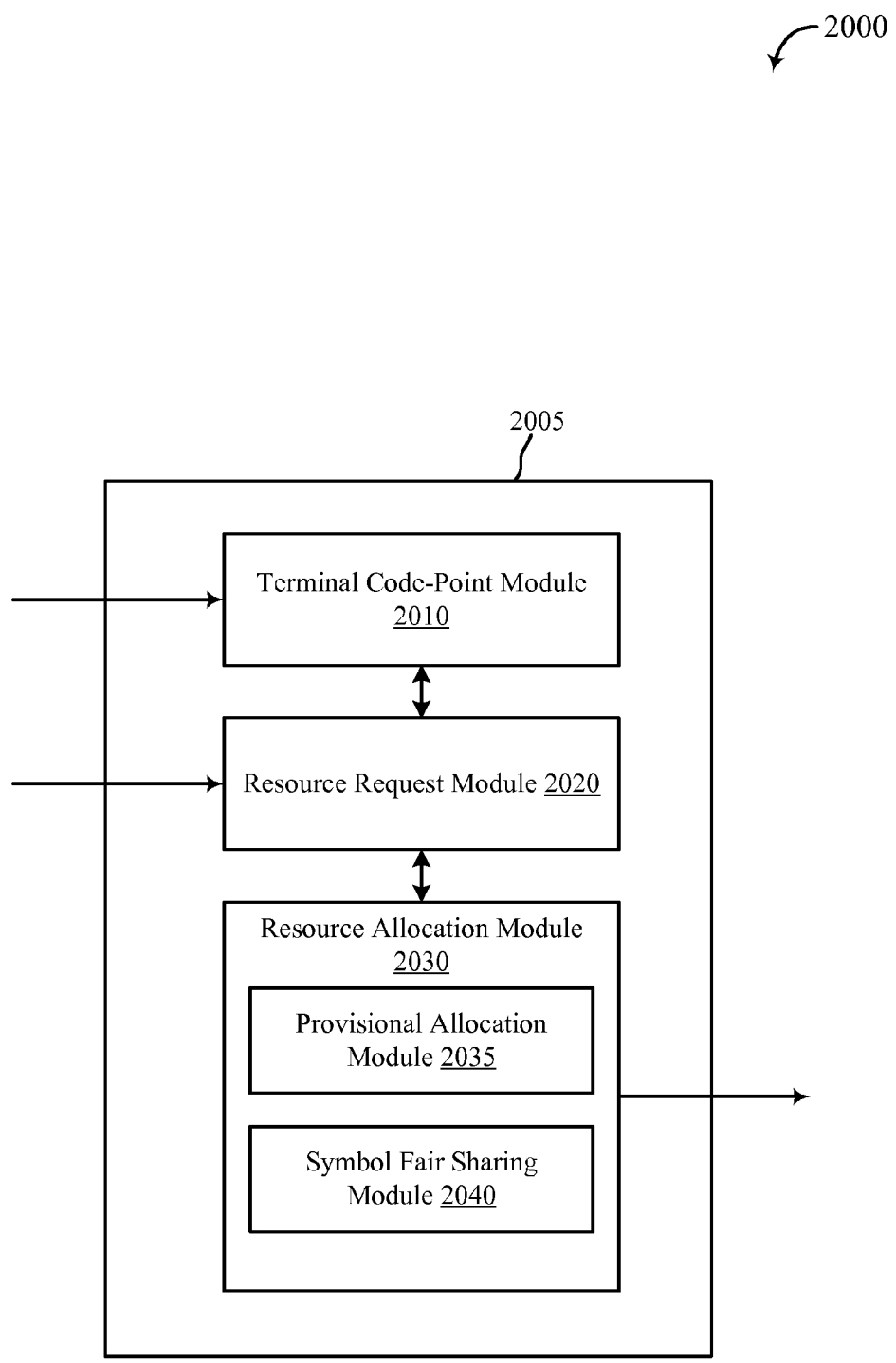
FIG. 20 shows a block diagram of a device for fair sharing of symbols in a communication system in accordance with various embodiments.

FIG. 20 shows a block diagram 2000 of a device 2005 for fair sharing of symbols in a communication system in accordance with various embodiments. Device 2005 may illustrate, for example, components of schedulers 140 of FIG. 1 or FIG. 19. Device 2005 may include terminal code-point module 2010, resource request module 2020, and resource allocation module 2030. Each of these modules may be communicatively coupled with any of the other modules.

The device 2005 may perform functions for allocating resources in a wireless communications system having a plurality of terminals 150 serviced via a shared communication channel (e.g., beam, carrier, etc.). The resource request module 2020 may receive resource requests for allocation time periods (e.g., frames, subframes, time slots, bursts, epochs, etc.). For example, the resource requests may be received from a gateway system 110 for scheduling forward link transmissions and from the terminals 150 for scheduling return link transmissions as described above.

The terminal code-point module 2010 may identify code-points for terminals serviced by the shared communication channel. For example, the terminal code-point module 2010 may receive information related to assigned code-points for the terminals, which may be assigned statically, semi-statically, or dynamically (e.g., based on measurements of link conditions, etc.). In some examples, a modem may use ACM for the communication channel and each terminal may be assigned a code-point (e.g., for forward link, return link, downlink, uplink, etc.) based on measurements of link conditions and a target error rate.

The resource allocation module 2030 may perform resource allocation of physical resource units (e.g., symbols, etc.) of the shared communication channel to the terminals serviced by the channel for a time period. The resource allocation module 2030 may include provisional allocation module 2035 and symbol fair sharing module 2040. Provisional allocation module 2035 may determine a provisional resource allocation according to the respective resource requests for the time period received by the resource request module 2020 and respective code-points associated with the terminals identified by the terminal code-point module 2010.

The resource allocation module 2030 may determine that aggregate demand for symbols for the plurality of terminals based on the provisional allocations for the time period exceeds available symbols of the shared communication channel. In these instances, symbol fair sharing module 2040 may performing fair sharing of symbols for a subset of terminals or for all terminals serviced by the communication channel. In some examples, fair sharing module 2040 may allocate a proportionate share of symbols of the communication channel to each terminal. In some examples, fair sharing of symbols may be according to service level of the terminals. For example, terminals may be allocated service level proportionate shares of the symbols of the communication channel for the time period. The resource allocation module 2030 may schedule resource allocations for data communications in the time period based on the fair sharing of symbols and, as appropriate, the provisional allocation for terminals not subject to fair sharing.

The resource allocation module 2030 may communicate the resource scheduling information for the time period to the appropriate entities for performing transmissions. For example, the resource allocation module 2030 may provide the scheduling information to components of the gateway system or satellite for forward link transmission of data via the communication channel (e.g., carrier, etc.). The gateway system or satellite may perform coding and modulation of data according to the code-points for the terminals using the resource scheduling for the time period and transmit the data in the communication channel. For return link transmissions from the terminals, the resource allocation module 2030 may provide the scheduling information for the time period to the terminal. The terminal may perform coding and modulation of data according to its assigned code-point and transmit the data in the assigned physical resources in the time period.

Figure 21:
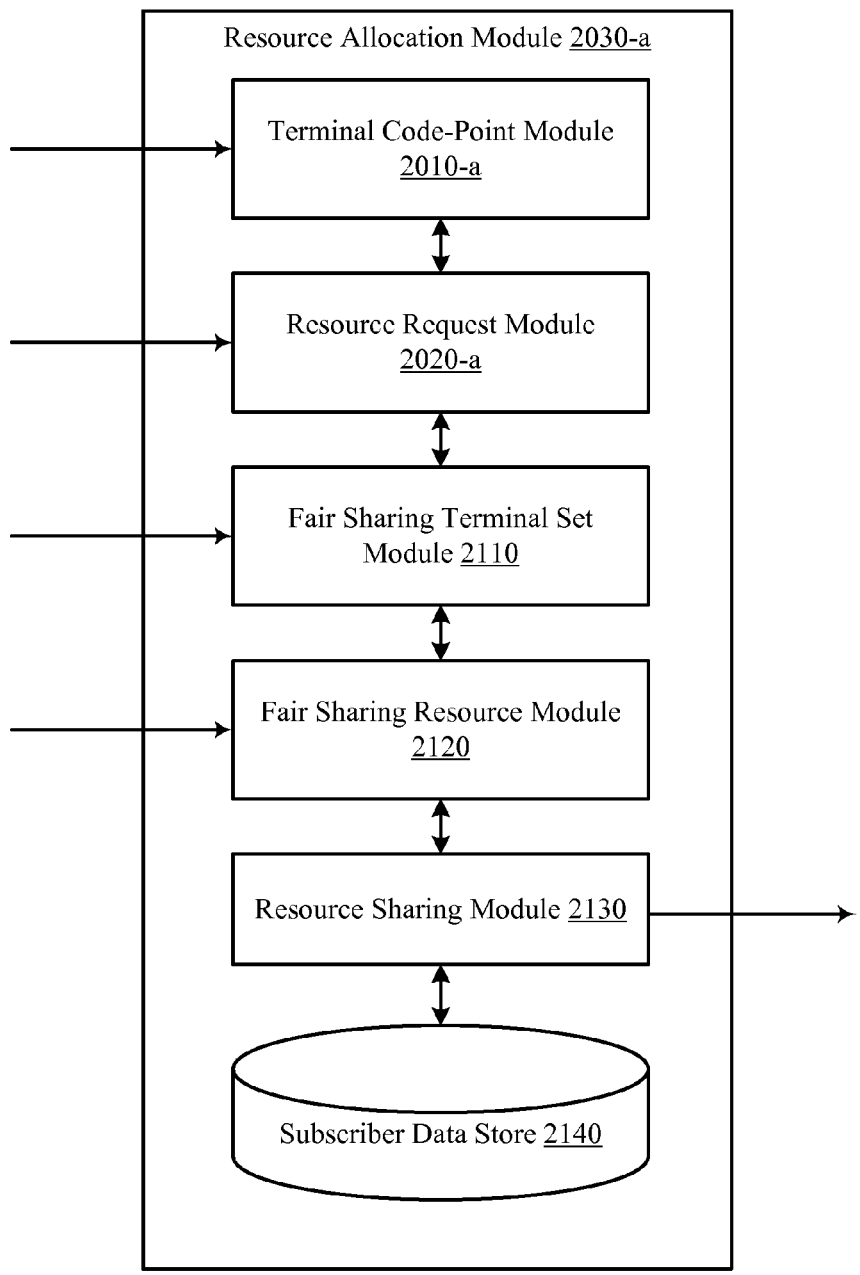
FIG. 21 shows a block diagram of a resource allocation module for fair sharing of symbols in a communication system in accordance with various embodiments.

FIG. 21 shows a block diagram 2100 of a resource allocation module 2030-*a* for fair sharing of symbols in a communication system in accordance with various embodiments. Resource allocation module 2030-*a* may illustrate, for example, aspects of resource allocation module 2030 of FIG. 20 in more detail. Resource allocation module 2030-*a* may include terminal code-point module 2010-*a*, resource request module 2020-*a*, fair sharing terminal set module 2110, fair sharing resource module 2120, resource sharing module 2130, and subscriber data store 2140. Each of these modules may be communicatively coupled with any of the other modules.

Terminal code-point module 2010-*a* and resource request module 2020-*a* may be examples of and may perform the functions of terminal code-point module 2010 and resource request module 2020 of FIG. 20, respectively.

Fair sharing terminal set module 2110 may determine a subset of terminals for fair sharing of symbols for an allocation time period. The subset of terminals may be determined as those terminals having respective code-points below a spectral efficiency threshold. In some examples, fair sharing of symbols may be applied to those terminals having respective code-points with low spectral efficiency that is determined to be caused by an operating condition such as a location of the terminal within a coverage area of a service beam, antenna pointing error, rain fade, and/or other operating conditions.

Fair sharing resource module 2120 may determine a subset of symbols for fair sharing among the subset of terminals for the time period. For example, the subset of symbols may be symbols remaining after allocation of symbols to the terminals having respective code-points with spectral efficiencies exceeding the spectral efficiency threshold. Additionally or alternatively, various service rate parameters may be considered in determining the subset of symbols for fair sharing among the subset of terminals. For example, service rate thresholds (e.g., MinIR, CIR, PIR, etc.) may be applied to data rate requests prior to determining the symbols remaining after allocation of symbols to the terminals having respective code-points with spectral efficiencies exceeding the spectral efficiency threshold.

Resource sharing module 2130 may re-allocate the subset of symbols to the subset of terminals using fair sharing of symbols. For example, each terminal of the subset of terminals may be allocated a proportionate share of the subset of symbols. In some examples, fair sharing of symbols may be according to service level of the terminals. Resource sharing module 2130 may retrieve information on service levels for the subset of terminals from the subscriber data store 2140. Each terminal of the subset of terminals may be allocated a service level proportionate share of the subset of symbols. Optionally, resource sharing module 2130 may apply service rate thresholds for the subset of terminals. For example, terminals having an effective bit-rate lower than the service rate threshold as a result of fair sharing of symbols may be re-allocated resources to provide for an effective bit rate of the service rate threshold.

The functions of the modules illustrated in FIG. 20 and FIG. 21 may be implemented, in whole or in part, with instructions embodied in a memory, formatted to be executed by one or more general or application-specific processors (e.g., CPUs, cores, etc.) of device 2005. For example, the modules of device 2005 including resource allocation modules 2030 may represent instructions embodied in one or more classes, modules, and/or packages that may be compiled to execute on the one or more processors or may be interpreted at run-time by the one or more processors. In other examples, various components of the devices and modules may, individually or collectively, be implemented in hardware using one or more application-specific integrated circuits (ASICs), Field Programmable Gate Arrays (FPGAs), and/or other Semi-Custom components or integrated circuits (ICs), which may be programmed (e.g., configured, synthesized from a hardware description language (HDL), etc.) in any manner known in the art.

Figure 22:
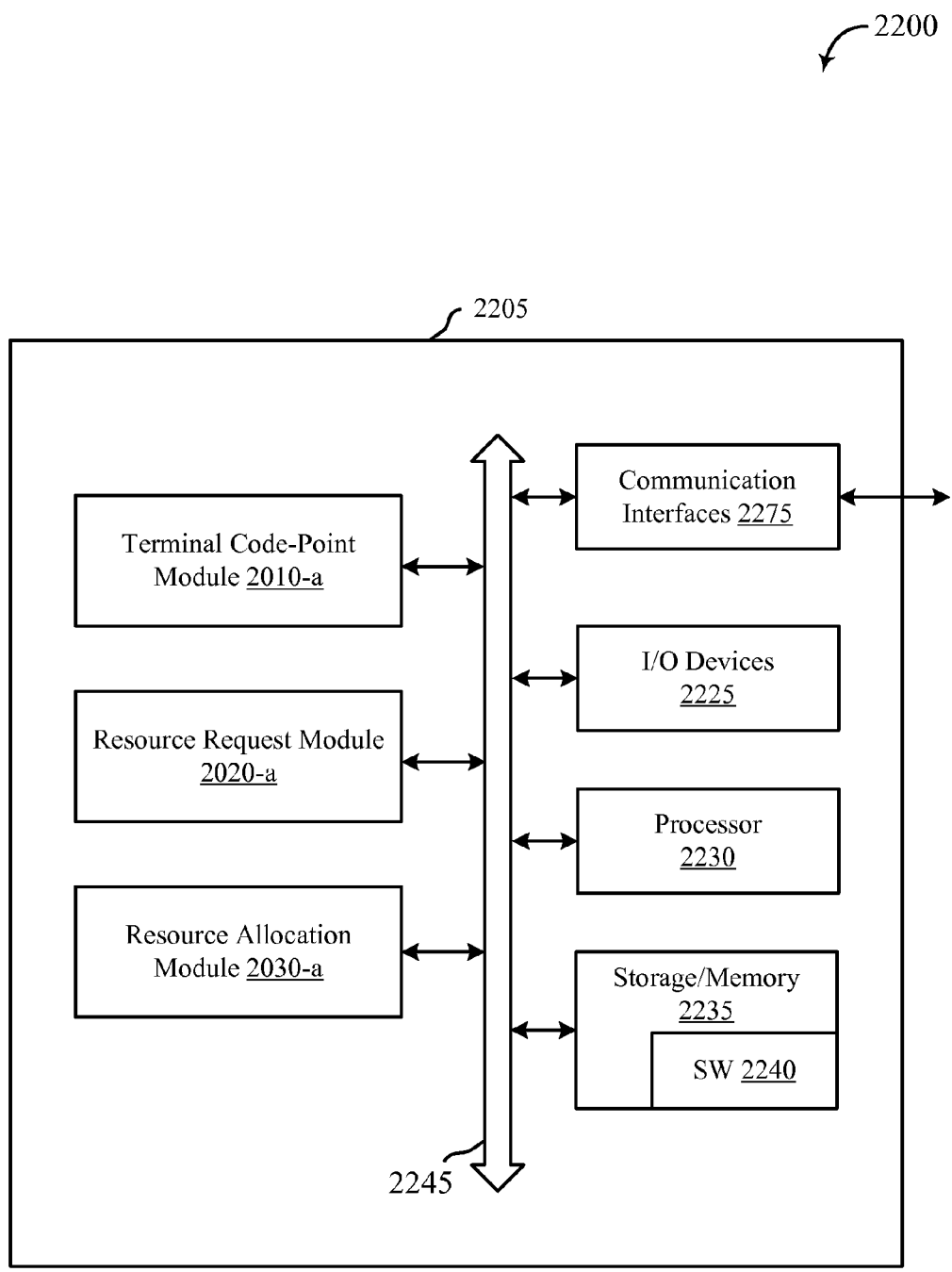
FIG. 22 shows a diagram of a scheduling server for fair sharing of symbols in a communication system in accordance with various embodiments.

FIG. 22 shows a diagram 2200 of a scheduling server 2205 for fair sharing of symbols in a communication system in accordance with various embodiments. Scheduling server 2205 may illustrate, for example, aspects of schedulers 140 of FIG. 1 and/or FIG. 19.

Scheduling server 2205 may include a processor module 2230 and storage/memory 2235 (including software/firmware 2240), which each may communicate, directly or indirectly, with each other (e.g., via one or more buses 2245). The scheduling server 2205 may include input/output (I/O) devices 2225 such as a keyboard, display, mouse, trackpad, and the like. The scheduling server 2205 may include one or more communication interfaces 2275 for communication with other components of the wireless communication system (e.g., data routing server, acceleration server, satellite modem units, etc.) or other networks (e.g., an Intranet, the Internet, etc.).

The scheduling server 2205 may include terminal code-point module 2010-b, resource request module 2020-b, and resource allocation module 2030-b. The terminal code-point module 2010-b, resource request module 2020-b, and resource allocation module 2030-b may be configured to implement the features and functions described above with reference to FIGS. 5-16 related to fair sharing of symbols in a shared communication channel. In some examples, terminal code-point module 2010-b, resource request module 2020-b, and resource allocation module 2030-b may be part of the software/firmware code 2240 and may include instructions that are configured to cause the processor module 2230 to perform various functions described herein (e.g., determining a subset of terminals for fair sharing of symbols, determining a subset of resources for re-allocation using fair sharing of symbols, performing re-allocation using fair sharing of symbols or service-level weighted fair sharing of symbols, etc.). The terminal code-point module 2010-b, resource request module 2020-b, and resource allocation module 2030-b may be examples of the terminal code-point modules 2010, resource request modules 2020, and resource allocation modules 2030 described with reference to FIGS. 20 and/or 21, respectively.

Figure 23:
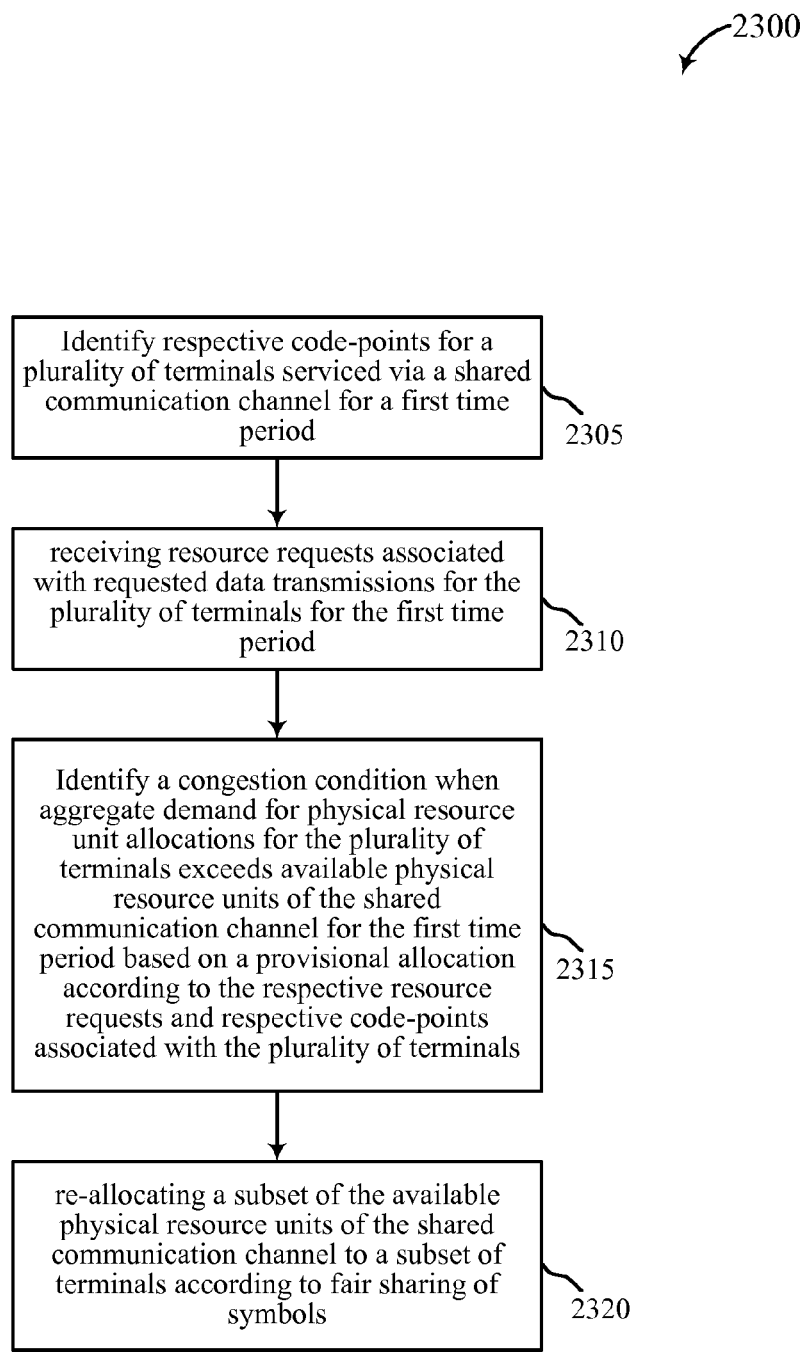
FIG. 23 shows a method for fair sharing of symbols in a communication system in accordance with various embodiments.

FIG. 23 shows a method 2300 for fair sharing of symbols in a communication system in accordance with various embodiments. The method 2300 may be performed by aspects of the systems 100 or 500 of FIG. 1 or FIG. 5 for allocation of physical resources of a shared communication channel (e.g., beam, carrier, frequency band, etc.) for an allocatable time period (e.g., epoch, frame, sub-frame, slot, symbol period, etc.). For example, the method 2300 may be performed by the schedulers 140 of FIG. 1 or FIG. 19, the device 2005 of FIG. 20, and/or the scheduling server 2205 of FIG. 22. Thus, these components may be means for performing the functions of method 2300.

Method 2300 may begin at block 2305, where respective code-points for a plurality of terminals serviced via a shared communication channel may be identified for a first time period. For example, the scheduler may receive information related to code-points assigned to terminals according to an ACM scheme for transmissions (e.g., forward link, return link, downlink, uplink, etc.) between a satellite and the plurality of terminals.

At block 2310, resource requests associated with requested data transmissions may be received (e.g., at a scheduler) for the plurality of terminals for the first time period. For example, the resource requests may be received from a gateway system 110 for scheduling forward link transmissions and from the terminals 150 for scheduling return link transmissions as described above.

At block 2315, a congestion condition may be identified when aggregate demand for physical resource unit allocations for the plurality of terminals exceeds available physical resource units of the shared communication channel for the first time period based on a provisional allocation according to the respective resource requests and respective code-points associated with the plurality of terminals.

At block 2320, re-allocation of a subset of the available physical resource units of the shared communication channel to a subset of terminals of the plurality of terminals may be performed responsive to detection of the congestion condition. The subset of terminals may include at least two terminals having different code-points. Respective re-allocated shares of the subset of the available physical resource units for the subset of terminals may be determined based on an amount of resources of the subset of the available physical resource units in relation to a number of terminals of the subset of terminals. In embodiments, the respective re-allocated shares are independent of the respective spectral efficiency values associated with the respective code-points for the subset of the terminals.

In some examples, re-allocation at block 2320 may include determining a subset of terminals for fair sharing of symbols for the time period (e.g., terminals having respective code-points below a spectral efficiency threshold, taking into account operating condition causing low spectral efficiency, etc.). Block 2320 may include determining the subset of the available physical resource units for fair sharing among the subset of terminals (e.g., the physical resource units remaining after allocation of symbols to the terminals having respective code-points with spectral efficiencies exceeding the spectral efficiency threshold, etc.). Block 2320 may include re-allocating the subset of physical resource units to the subset of terminals using fair sharing of symbols (e.g., proportionate shares, service level weighted proportionate shares, etc.).

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or combinations thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A method for allocating resources in a wireless communications system having a plurality of terminals serviced via a shared communication channel, wherein each code-point for coding and modulation of communications over the shared communication channel is associated with a spectral efficiency value, and wherein the resources are defined by physical resource units comprising frequency and time resources of the shared communication channel, the method comprising:
   identifying respective code-points for the plurality of terminals serviced via the shared communication channel for a first time period;
   receiving resource requests associated with requested data transmissions for the plurality of terminals for the first time period;
   identifying a congestion condition when aggregate demand for physical resource unit allocations for the plurality of terminals exceeds available physical resource units of the shared communication channel for the first time period based on a provisional allocation according to the respective resource requests and the respective code-points associated with the plurality of terminals; and
   re-allocating a subset of the available physical resource units of the shared communication channel to a subset of terminals of the plurality of terminals in response to the congestion condition, the subset of terminals comprising at least two terminals having different code-points, wherein respective re-allocated shares of the subset of the available physical resource units for the subset of terminals are determined based on an amount of resources of the subset of the available physical resource units in relation to a number of terminals of the subset of terminals, and wherein the respective re-allocated shares are independent of the respective spectral efficiency values associated with the respective code-points for the subset of terminals.

2. The method of claim 1, further comprising:
   communicating resource grants for the plurality of terminals for the first time period, wherein respective data transmitted to the plurality of terminals according to the resource grants is coded and modulated onto the shared communications channel according to the respective code-points identified for the plurality of terminals.

3. The method of claim 1, wherein each of the plurality of terminals are associated with a provisioned service level, and wherein the re-allocating comprises:
   re-allocating the subset of the available physical resource units for the first time period to the subset of terminals such that the respective re-allocated shares are proportionate to the respective provisioned service levels associated with the subset of terminals.

4. The method of claim 3, wherein the provisioned service levels comprise any of: a minimum information rate, a committed information rate, a peak information rate, or combinations thereof.

5. The method of claim 1, wherein the subset of terminals comprises terminals of the plurality of terminals for which respective spectral efficiency values are below a threshold for the first time period.

6. The method of claim 1, wherein the respective re-allocated shares for the first time period for the at least two terminals having different code-points comprise a same amount of physical resource units when the at least two terminals have a same provisioned service level.

7. The method of claim 1, further comprising:
   determining respective proportional resource allocations for the plurality of terminals for the first time period based on respective service levels for the plurality of terminals and the available physical resource units for the shared communication channel for the first time period; and determining respective requested physical resource units for the plurality of terminals for the first time period based on the resource requests and the respective spectral efficiency values for the plurality of terminals, wherein the subset of terminals comprises terminals for which the respective requested physical resource units exceed the respective proportional resource allocation for the first time period.

8. The method of claim 7, further comprising:

determining the subset of the available physical resource units as physical resource units for the first time period of the available physical resource units remaining after allocation of physical resource units of the available physical resource units to terminals for which the respective requested physical resource units do not exceed the respective proportional resource allocations for the first time period.

9. The method of claim 1, further comprising:

determining for one or more terminals of the subset of terminals that an allocated service rate, according to the respective re-allocated shares for the one or more terminals and the respective spectral efficiency values for the one or more terminals, is below a service rate threshold; and re-allocating the available physical resource units such that the one or more terminals are allocated amounts of physical resource units corresponding to the service rate threshold based on the respective spectral efficiency values of the one or more terminals.

10. The method of claim 1, further comprising:

identifying the subset of terminals for the re-allocating based on any of: locations of the subset of terminals within a coverage area of at least one service beam, pointing errors associated with the subset of terminals, a rain fade condition for the subset of terminals, and combinations thereof.

11. The method of claim 1, wherein the coding and modulation of communications over the shared communication channel comprises adaptive coding and modulation (ACM) according to respective channel conditions for the plurality of terminals.

12. The method of claim 1, wherein the shared communication channel is one of a service beam communication channel or a feeder beam communication channel of a satellite communications system.

13. The method of claim 1, wherein the shared communication channel is one of a forward link communication channel or a return link communication channel of the wireless communications system.

14. The method of claim 1, wherein the physical resource units comprise symbols of one or more carriers of the shared communication channel.

15. An apparatus for allocating resources in a wireless communications system having a plurality of terminals serviced via a shared communication channel, wherein each code-point for coding and modulation of communications over the shared communication channel is associated with a spectral efficiency value, and wherein the resources are defined by physical resource units comprising frequency and time resources of the shared communication channel, comprising:

a terminal code-point module configured to identify respective code-points for the plurality of terminals serviced via the shared communication channel for a first time period;

a resource request module configured to receive resource requests associated with requested data transmissions for the plurality of terminals for the first time period;

a provisional allocation module configured to identify a congestion condition when aggregate demand for physical resource unit allocations for the plurality of terminals exceeds available physical resource units of the shared communication channel for the first time period based on a provisional allocation according to the respective resource requests and the respective code-points associated with the plurality of terminals; and a symbol fair sharing module configured to re-allocate a subset of the available physical resource units of the shared communication channel to a subset of terminals of the plurality of terminals in response to the congestion condition, the subset of terminals comprising at least two terminals having different code-points, wherein respective re-allocated shares of the subset of the available physical resource units for the subset of terminals are determined based on an amount of resources of the subset of the available physical resource units in relation to a number of terminals of the subset of terminals, and wherein the respective re-allocated shares are independent of the respective spectral efficiency values associated with the respective code-points for the subset of terminals.

16. The apparatus of claim 15, wherein each of the plurality of terminals are associated with a provisioned service level, and wherein the symbol fair sharing module is configured to re-allocate the subset of the available physical resource units for the first time period to the subset of terminals such that the respective re-allocated shares are proportionate to the respective provisioned service levels associated with the subset of terminals.

17. The apparatus of claim 15, wherein the subset of terminals comprises terminals of the plurality of terminals for which respective spectral efficiency values are below a threshold for the first time period.

18. The apparatus of claim 15, wherein the symbol fair sharing module is further configured to:

determine for one or more terminals of the subset of terminals that an allocated service rate, according to the respective re-allocated shares for the one or more terminals and the respective spectral efficiency values for the one or more terminals, is below a service rate threshold; and re-allocate the available physical resource units such that the one or more terminals are allocated amounts of physical resource units corresponding to the service rate threshold based on the respective spectral efficiency values of the one or more terminals.

19. The apparatus of claim 15, wherein the shared communication channel is one of a service beam communication channel or a feeder beam communication channel of a satellite communication system.

20. The apparatus of claim 19, wherein the symbol fair sharing module is further configured to:

identify the subset of terminals for the re-allocating based on any of: locations of the subset of terminals within a coverage area of the at least one service beam, pointing errors associated with the subset of terminals, a rain fade condition for the subset of terminals, and combinations thereof.

21. A non-transitory computer-readable medium for allocating resources in a wireless communications system having a plurality of terminals serviced via a shared communication channel, wherein each code-point for coding and modulation of communications over the shared communication channel is associated with a spectral efficiency value, and wherein the resources are defined by physical resource units comprising frequency and time resources of the shared communication channel, the non-transitory computer-readable medium storing instructions executable by a processor for:

identifying respective code-points for the plurality of terminals serviced via the shared communication channel for a first time period;

receiving resource requests associated with requested data transmissions for the plurality of terminals for the first time period;

identifying a congestion condition when aggregate demand for physical resource unit allocations for the plurality of terminals exceeds available physical resource units of the shared communication channel for the first time period based on a provisional allocation according to the respective resource requests and the respective code-points associated with the plurality of terminals; and re-allocating a subset of the available physical resource units of the shared communication channel to a subset of terminals of the plurality of terminals in response to the congestion condition, the subset of terminals comprising at least two terminals having different code-points, wherein respective re-allocated shares of the subset of the available physical resource units for the subset of terminals are determined based on an amount of resources of the subset of the available physical resource units in relation to a number of terminals of the subset of terminals, and wherein the respective re-allocated shares are independent of the respective spectral efficiency values associated with the respective code-points for the subset of terminals.

* * * * *